US010063292B2

(12) United States Patent
Hirsch et al.

(10) Patent No.: US 10,063,292 B2
(45) Date of Patent: Aug. 28, 2018

(54) MULTI-USER OPERATION MANAGEMENT

(71) Applicant: QUALCOMM Incorporated, San Diego, CA (US)

(72) Inventors: Olaf Josef Hirsch, Sunnyvale, CA (US); Xiaolong Huang, San Jose, CA (US); Srinivas Katar, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 14/831,349

(22) Filed: Aug. 20, 2015

(65) Prior Publication Data
US 2016/0226566 A1 Aug. 4, 2016

Related U.S. Application Data

(60) Provisional application No. 62/110,974, filed on Feb. 2, 2015.

(51) Int. Cl.
*H04B 7/04* (2017.01)
*H04B 7/0452* (2017.01)
(Continued)

(52) U.S. Cl.
CPC ......... *H04B 7/0452* (2013.01); *H04B 7/0623* (2013.01); *H04B 7/0689* (2013.01);
(Continued)

(58) Field of Classification Search
None
See application file for complete search history.

(56) References Cited

U.S. PATENT DOCUMENTS

2010/0061326 A1\* 3/2010 Lee ................ H04W 88/06
370/329
2010/0254330 A1 10/2010 Lee et al.
(Continued)

FOREIGN PATENT DOCUMENTS

EP 2709415 A1 3/2014
WO WO-2014123388 A1 8/2014

OTHER PUBLICATIONS

Theeksha et al., Performance Analysis and Mode Selection of SU-MIMO and MU-MIMO in 802.11ac, Jul. 25, 2013, 2013 International Conference on Recent Trends in Information Technology (ICRTIT), whole document.\*
(Continued)

*Primary Examiner* — Hanh N Nguyen
*Assistant Examiner* — Jose L Perez
(74) *Attorney, Agent, or Firm* — Holland & Hart LLP

(57) ABSTRACT

Methods, devices, and computer-readable media for wireless communication may involve techniques for managing multi-user (MU) operation when a device in a wireless network has coexisting radios. Such techniques may involve identifying a change in a multiple radio access technology (RAT) coexistence status of a first device, e.g., a change between a coexistence status that is not disruptive to MU communications and one that is disruptive. For a device communicating with a network using Wi-Fi, the change in the multiple RAT coexistence status may indicate a change between inactive Bluetooth (BT) communications and active BT communications concurrent with Wi-Fi communications. Based at least in part on the identified change in the multiple RAT coexistence status, a MU communications operation at a second device may be adjusted, for example, by disabling MU communication between the first and second devices
(Continued)

over a first RAT when the first device changes to a coexistence status that may disrupt MU communications.

30 Claims, 14 Drawing Sheets

(51) Int. Cl.
| | |
|---|---|
| *H04W 24/02* | (2009.01) |
| *H04B 7/06* | (2006.01) |
| *H04B 7/08* | (2006.01) |
| *H04W 52/02* | (2009.01) |
| *H04W 72/12* | (2009.01) |
| *H04W 88/08* | (2009.01) |
| *H04W 88/06* | (2009.01) |
| *H04W 72/04* | (2009.01) |

(52) U.S. Cl.
CPC .......... *H04B 7/0871* (2013.01); *H04W 24/02* (2013.01); *H04W 52/0225* (2013.01); *H04W 72/1215* (2013.01); *H04W 72/046* (2013.01); *H04W 88/06* (2013.01); *H04W 88/08* (2013.01); *Y02D 70/00* (2018.01); *Y02D 70/1262* (2018.01); *Y02D 70/142* (2018.01); *Y02D 70/144* (2018.01); *Y02D 70/166* (2018.01); *Y02D 70/444* (2018.01)

(56) References Cited

U.S. PATENT DOCUMENTS

| | | | |
|---|---|---|---|
| 2012/0020229 A1 | 1/2012 | Dayal et al. | |
| 2012/0127940 A1* | 5/2012 | Lee ...................... | H04L 5/0023 370/329 |
| 2013/0102342 A1* | 4/2013 | Tesanovic ............ | H04B 7/0623 455/507 |
| 2013/0208587 A1* | 8/2013 | Bala ...................... | H04W 16/14 370/230 |
| 2013/0272211 A1* | 10/2013 | Quan ................... | H04B 7/0452 370/329 |
| 2013/0301569 A1 | 11/2013 | Wang et al. | |
| 2013/0315141 A1* | 11/2013 | Homchaudhuri ..... | H04W 88/06 370/328 |
| 2014/0029535 A1 | 1/2014 | Medapalli | |
| 2014/0056205 A1 | 2/2014 | Aboul-Magd et al. | |
| 2014/0093005 A1* | 4/2014 | Xia ...................... | H04B 7/0617 375/267 |
| 2014/0112406 A1* | 4/2014 | Zhu ...................... | H04B 7/0452 375/267 |
| 2014/0254408 A1 | 9/2014 | Shukla et al. | |
| 2014/0369272 A1 | 12/2014 | Amini et al. | |
| 2015/0110058 A1* | 4/2015 | Shapira ................ | H04B 1/3805 370/329 |
| 2015/0230231 A1* | 8/2015 | Fornoles, Jr. ........ | H04B 7/0452 455/509 |
| 2015/0358105 A1 | 12/2015 | Jung et al. | |
| 2016/0112886 A1* | 4/2016 | Malik ................... | H04W 4/80 370/225 |
| 2016/0183289 A1* | 6/2016 | Qiang ................. | H04W 72/1273 370/280 |
| 2016/0269085 A1* | 9/2016 | Kim .................... | H04B 7/0452 |

OTHER PUBLICATIONS

Hassine et al. "MAC aggregation in 802.11 n: Concepts and impact on wireless networks performance", Jun. 17-19, 2014, The 2014 International Symposium on Networks, Computers and Communications, whole document.*

ISA/EPO, International Search Report and Written Opinion of the International Searching Authority, Int'l App. No. PCT/US2016/012876, dated Mar. 10, 2016, European Patent Office, Rijswijk, NL, 15 pgs.

Kim et al., "An Efficient power-saving protocol for internet traffic in wireless LANs," 2005 IEEE 62nd Vehicular Technology Conference, VTC-2005-Fall, Sep. 25-28, 2005, pp. 784-788, vol. 2, XP_10878590A, ISBN 0-7803-9152-7, Institute of Electrical and Electronics.

Qiao et al., "Goodput Analysis and Link Adaptation for IEEE 802.11a Wireless LANs," IEEE Transactions on Mobile Computing, Oct.-Dec. 2002, pp. 278-292, vol. 1, Issue: 4, XP_11095552A, ISSN 1536-1233, Institute of Electrical and Electronics.

* cited by examiner

MULTI-USER OPERATION MANAGEMENT

CROSS REFERENCES

The present application for patent claims priority to U.S. Provisional Patent Application No. 62/110,974 by Hirsch et al., entitled "Multi-User Operation Management," filed Feb. 2, 2015, assigned to the assignee hereof, and expressly incorporated by reference herein.

BACKGROUND

Field of the Disclosure

The following relates generally to wireless communication, and more specifically to techniques for managing multi-user operation when one or more wireless communication devices have active coexisting radio access technologies.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power).

A wireless communications network may include a number of network devices, e.g., an access point (AP), that can support communication for a number of wireless communication devices. A wireless device may communicate with a network device bi-directionally. For example, in a wireless local area network (WLAN), a station (STA) may communicate with an associated AP via downlink and uplink. From the perspective of a STA, the downlink (or forward link) refers to the communication link from the AP to the station, and the uplink (or reverse link) refers to the communication link from the station to the AP.

In many cases, a wireless communication device may have multiple coexisting radios for different radio access technologies (RATs). For example, a wireless communication device may use one radio to send and receive WLAN communications and another radio to send and receive BLUETOOTH® (Bluetooth or BT) communications. The close proximity of the radios to each other may result in unwanted interference, especially when both of the radios are operating at the same time. Further, BT communications may disrupt multi-user (MU) multiple input multiple output (MIMO) operation, such as sounding and MU physical layer convergence protocol (PLCP) protocol data unit (PPDU) transmissions, at the WLAN radio. Such disruption may negatively affect throughput at one or both of the radios.

SUMMARY

The described features generally relate to techniques for managing multi-user (MU) operation (e.g., multi-user multiple input multiple output (MU-MIMO)) when a device in a wireless network has coexisting radios. Such techniques may involve identifying a change in a multiple radio access technology (RAT) coexistence status of a first device, such as a change from a coexistence status that is not disruptive to MU-MIMO communications to a coexistence status that is disruptive, or vice versa. In the case of a device communicating with a wireless local area network (WLAN) using Wi-Fi, the change in the multiple RAT coexistence status may indicate a change from inactive BLUETOOTH® (Bluetooth or BT) communications to active BT communications concurrent with Wi-Fi communications, or vice versa.

Based at least in part on the identified change in the multiple RAT coexistence status, a MU-MIMO communications operation at a second device may be adjusted. For example, the second device may disable MU-MIMO communication between the first device and the second device over a WLAN when the first device begins to transmit using BT or otherwise changes to a coexistence status that may disrupt MU-MIMO communications.

A method of wireless communication is described. The method may involve identifying a change in a multiple RAT coexistence status of a first device. Based at least in part on the identified change in the multiple RAT coexistence status, an MU-MIMO wireless communication operation at a second device may be adjusted. Adjusting the MU-MIMO operation may involve switching from MU-MIMO to single-user communications, or vice versa. Thus, adjusting the MU-MIMO operation may include disabling MU-MIMO communication between the first device and the second device, or enabling MU-MIMO communication between the first device and the second device. In the case of disabling MU-MIMO communication between the first device and the second device, the method further may involve using single-user (SU) MIMO communication between the first device and the second device.

Identifying the change in the multiple RAT coexistence status may involve receiving at the second device a request from the first device. The request may be a request to enable MU-MIMO communications or a request to disable MU-MIMO communications. The request may be a vendor-specific action frame. Identifying the change in the multiple RAT coexistence status may involve receiving a power save poll (PS-POLL) at the second device from the first device. Identifying the change in the multiple RAT coexistence status may involve detecting an enablement of a media access control (MAC) aggregation mode at the first device or detecting a disablement of a MAC aggregation mode at the first device.

The method also may involve performing a beam forming sounding operation. The change in the multiple RAT coexistence status may be identified in response to the beam forming sounding operation. In this case, identifying the change in the multiple RAT coexistence status may involve detecting a number of compressed beam forming (CBF) failures from the beam forming sounding operation is above a predetermined threshold.

The method also may involve detecting an expiration of a timer set based at least in part on the change in the multiple RAT coexistence status. Based at least in part on the detected expiration of the timer, the adjustment of the MU-MIMO wireless communication operation may be reversed. In such case, a duration of the timer may be set based at least in part on a number of CBF failures occurring since a previous timer expiration.

The change in the multiple RAT coexistence status of the first device may be an activation of a coexistence mode at the first device that is disruptive to MU-MIMO communications or a deactivation of a coexistence mode at the first device that is disruptive to MU-MIMO communications.

A device for wireless communications with another device is described. The device may include a detector to identify a change in a multiple RAT coexistence status of the other device. The device also may include a coordinator to adjust an MU-MIMO wireless communication operation with the other device based at least in part on the identified change in the multiple RAT coexistence status.

The coordinator to adjust the MU-MIMO wireless communication operation may be configured to cause the device to disable MU-MIMO communication with the other device. The detector to identify the change in the multiple RAT coexistence status may be configured to determine the change in the multiple RAT coexistence status from a received PS-POLL from the other device. The detector to identify the change in the multiple RAT coexistence status may be configured to detect an enablement of a media access control (MAC) aggregation mode at the other device or detecting a disablement of a MAC aggregation mode at the other device.

The coordinator may be further configured to perform a beam forming sounding operation, and the detector may be further configured to identify the change in the multiple RAT coexistence status in response to the beam forming sounding operation. In this case, the detector may be further configured to detect if a number of CBF failures reaches a predetermined threshold.

The device may further include a timer, where the timer may be set in response to the change in the multiple RAT coexistence status. The coordinator may be further configured to reverse the adjustment of the MU-MIMO wireless communication operation based at least in part on an expiration of the timer. A time duration to set the timer may be based at least in part on a number of CBF failures occurring since a previous timer expiration.

The change in the multiple RAT coexistence status of the other device may include an activation of a coexistence mode at the other device that is disruptive to MU-MIMO communications or a deactivation of a coexistence mode at the other device that is disruptive to MU-MIMO communications.

The device may be an access point (AP). An indication of the change in the multiple RAT coexistence status from the other device may include a change in at least one of a profile of a non-WLAN radio of the other device, a protocol of the non-WLAN radio of the other device, or a level of activity of the non-WLAN radio of the other device. The non-WLAN radio may be a Bluetooth radio. The device may include a WLAN transceiver configured to communicate with the other device or a wireless wide area network (WWAN) transceiver configured to communicate with the other device.

A non-transitory computer-readable medium is described. The non-transitory computer-readable medium may contain program instructions that, when executed by a processor of an access point, may cause the access point to perform operations including: identifying a change in operation of a Bluetooth radio of a station connected to the access point; and adjusting an MU-MIMO wireless communication operation with the station of a WLAN radio of the access point.

Another device for wireless communications with another device is described. The device may include: means for identifying a change in a multiple RAT coexistence status of the other device; and means for adjusting an MU-MIMO wireless communication operation with the other device based at least in part on the identified change in the multiple RAT coexistence status.

The means for adjusting the MU-MIMO wireless communication operation may further include means for disabling MU-MIMO communication with the other device. The means for adjusting the MU-MIMO wireless communication operation may be further configured to perform a beam forming sounding operation. In this case, the means for identifying may be further configured to identify the change in the multiple RAT coexistence status in response to the beam forming sounding operation. The means for adjusting the MU-MIMO wireless communication operation may further include means for detecting if a number of CBF failures reaches a predetermined threshold.

Another method of wireless communication is described. The method may involve detecting a change in a RAT coexistence status of a first device. Based at least in part on the detected change, a message may be transmitted to a second device. The message may trigger an adjustment of an MU-MIMO operation at the second device.

The message may be a request to enable MU-MIMO communications or a request to disable MU-MIMO communications. Further, the message may be a vendor-specific action frame. The detected change in the multiple RAT coexistence status of the first device may be an activation of a coexistence mode at the first device that is disruptive to MU-MIMO communications or a deactivation of a coexistence mode at the first device that is disruptive to MU-MIMO communications.

Another device for wireless communication with another device is described. The device may include: means for detecting a change in a multiple RAT coexistence status of the device; and means for transmitting a message to the other device based at least in part on the detected change. The message may trigger an adjustment of an MU-MIMO operation at the other device.

Another device for wireless communication with another device is described. The device may include a detector to detect a change in a multiple RAT coexistence status of the device. The device also may include a transmitter to transmit a message to the other device based at least in part on the detected change. The message may trigger an adjustment of an MU-MIMO operation at the other device.

Another non-transitory computer-readable medium is described. The medium may contain program instructions that, when executed by a processor of a device, cause the device to: detect a change in a multiple RAT coexistence status of the device; and transmit a message to the other device based at least in part on the detected change. The message may trigger an adjustment of an MU-MIMO operation at the other device.

Further scope of the applicability of the described methods and devices will become apparent from the following detailed description, claims, and drawings. The detailed description and specific examples are given by way of illustration, as various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
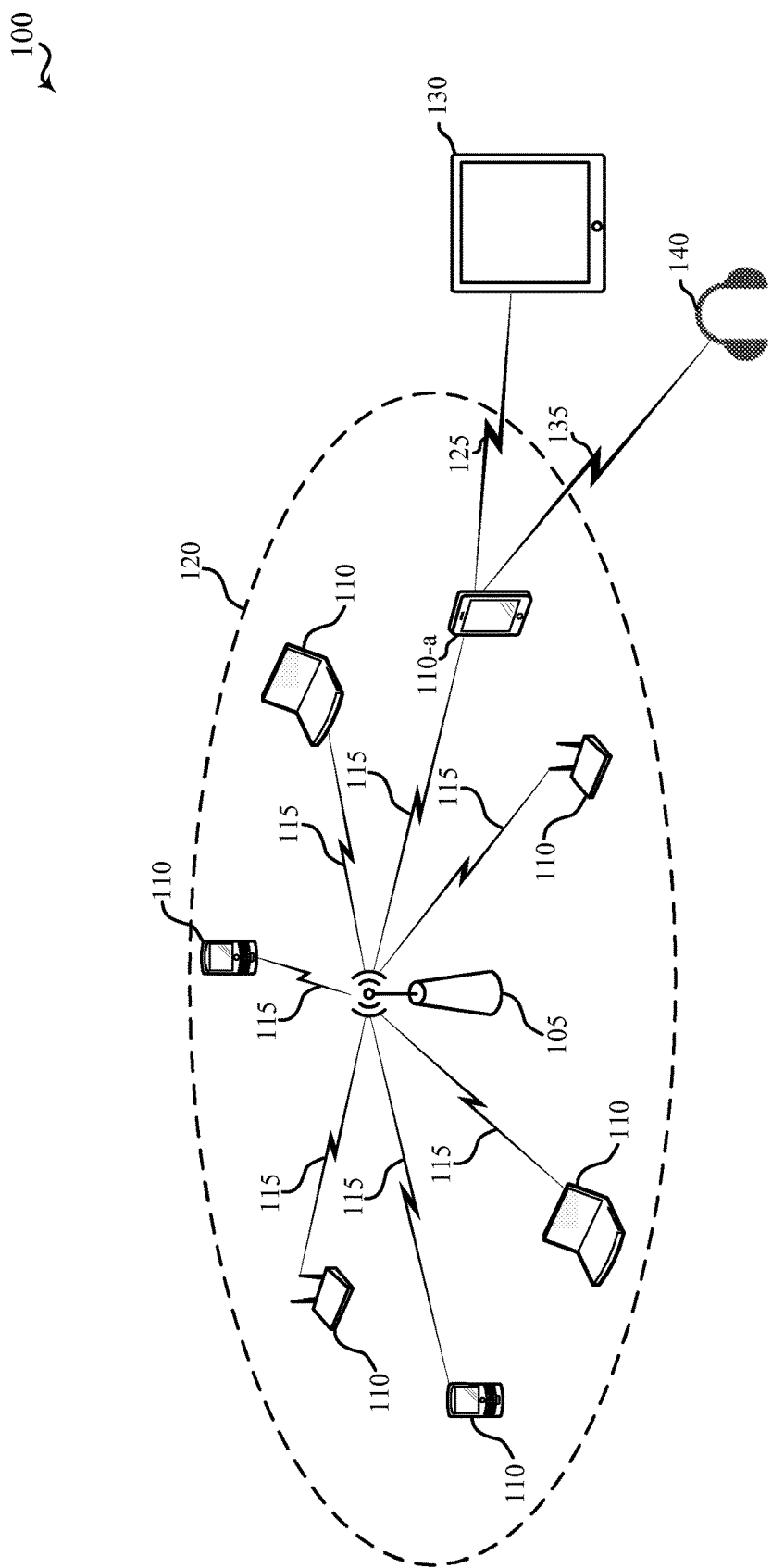
FIG. 1 illustrates an example of a wireless communications system in accordance with various examples.

The described features generally relate to one or more improved systems, methods, and/or devices for wireless communication. A wireless communication device may have multiple coexisting radios for different radio access technologies (RATs). For example, a wireless communication device may use one radio to send and receive wireless local area network (WLAN) communications and another radio to send and receive Bluetooth (BT) communications. However, in a wireless device with coexisting radios, some modes of operation for a first radio may disrupt multi-user multiple input multiple output (MU-MIMO) operations for a second radio. The disruption in MU-MIMO operations may negatively affect throughput at the wireless communication device.

Therefore, excluding the wireless communication device from MU-MIMO WLAN communications (e.g., while performing single user (SU) communications with the wireless communication device) may be beneficial when the first radio is actively communicating or otherwise operating in a way that interferes with MU-MIMO operations at the second radio. Otherwise, when the first radio is not actively communicating, the wireless communication device may be included for MU-MIMO communications using the second radio. A separate device, such as an access point (AP), may manage MU-MIMO operations for the wireless communication device based at least in part on the status of the coexistence radios at the wireless communication device (i.e., a "multiple RAT coexistence status" of the wireless communication device).

For example, an AP may identify a change in the multiple RAT coexistence status of the wireless communication device. Identifying the change in the multiple RAT coexistence status may involve receiving a request from the wireless communication device to enable or disable MU-MIMO communications for the wireless communication device. Alternatively, identifying the change in the multiple RAT coexistence status may involve receiving a power save poll (PS-POLL) from the wireless communication device. Further, identifying the change in the multiple RAT coexistence status may involve detecting enablement or disablement of a media access control (MAC) aggregation mode at the coexistence wireless communication device.

The AP may adjust a MU-MIMO wireless communication operation based at least in part on the identified change in the multiple RAT coexistence status. Such adjustment may involve disabling or enabling MU-MIMO communication between the AP and the coexistence wireless communication device.

The following description provides examples, and is not limiting of the scope, applicability, or configuration set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

FIG. 1 illustrates an example of a wireless local area network (WLAN) 100 (also known as a Wi-Fi network) configured in accordance with various examples. The WLAN 100 includes an access point (AP) 105 and multiple associated stations (STAs) 110. In this example, there are shown seven (7) STAs 110; however, the WLAN 100 may have more or fewer STAs 110 than those shown in FIG. 1 since the number shown is simply for illustrative purposes. The AP 105 and the associated STAs 110 may represent a basic service set (BSS) or an extended service set (ESS). The various STAs 110 in the network are able to communicate with one another through the AP 105. Also shown is a coverage area 120 of the AP 105, which may represent a basic service area (BSA) of the WLAN 100. Although not shown in FIG. 1, an extended network base station associated with the WLAN 100 may be connected to a wired or wireless distribution system (DS) that may allow multiple APs 105 to be connected in an ESS.

The AP 105 may be configured to communicate bi-directionally with each of the STAs 110 using WLAN communication links 115. The WLAN communication links 115 may include downlink transmissions (e.g., beacon frames) that are sent from the AP 105 to a STA 110, as well as uplink transmissions (e.g., acknowledgement (ACK) frames) that are sent from a STA 110 to the AP 105. The AP 105 may be configured to communicate simultaneously with multiple STAs 110 using MU-MIMO operations. Alternatively or additionally, the AP 105 may communicate with individual STAs 110 using single-user (SU) operations. For example, the AP 105 may communicate simultaneously with a subset of the STAs 110 during MU operation, while communicating with a STA 110-a individually during SU operation.

A STA 110-a, for example, also may communicate over a non-WLAN communication link 125 with a peripheral device 130 (e.g., a tablet) outside of the WLAN 100 using a non-WLAN radio, such as a cellular radio (e.g., long term evolution (LTE)). Alternatively or additionally, the STA 110-a may communicate over a non-WLAN communication link 135 with another peripheral device 140 (e.g., a wireless headset) outside of the WLAN 100 using a different non-WLAN radio, such as a BT radio. Although not shown for the sake of simplicity, one of the peripheral devices 130, 140 may be another STA 110 with which the STA 110-a communicates over a non-WLAN connection instead of through the WLAN 100.

As noted above, certain communications over the non-WLAN communication links 125, 135 may disrupt MU-MIMO operation in the WLAN 100. For example, if the non-WLAN radio is a BT radio, various BT profiles and protocols may be defined which may control how the BT radio communicates over a non-WLAN communication link 125, 135. Some of these profiles or protocols may be incompatible with MU-MIMO operation at the coexisting WLAN radio. For example, when a BT radio of the STA 110-a is operating according to a synchronous connection-oriented (SCO) or enhanced SCO (eSCO) protocol, the BT radio may prevent the successful transmission of block acknowledgements (BAs) by the WLAN radio of the STA 110-a to the AP 105. This failure to transmit a block acknowledgment may result in the AP 105 not sending a block acknowledgement request to other STAs 110 or otherwise delay MU-MIMO transmissions. On the other hand, certain protocols and profiles of the BT radio, such as Advanced Audio Distribution Profile (A2DP), may be compatible with MU-MIMO transmissions by the WLAN radio.

The STA 110-a may manage its communications across multiple coexisting radios, such as a radio for WLAN communication links 115 and a radio for non-WLAN communication links 125 or 135. For example, the radios may communicate with each other using scheduling messages to determine whether parallel or concurrent transmissions are scheduled, and if so, whether parallel or concurrent transmissions are possible. Based on these determinations, transmissions by the radios may be coordinated to avoid interfering with or overpowering one another such as by adapting a transmission power of a communication, delaying transmission of a communication, and/or adapting a frame size of a communication. However, such management of communications at the STA 110-a may not take into account disruptions to MU-MIMO operations.

Thus, techniques described herein allow for MU-MIMO management (e.g., participation or exclusion of the STA 110-a from MU-MIMO communications with the AP 105) in the WLAN 100 based at least in part on a multiple RAT coexistence status of the STA 110-a. The multiple RAT coexistence status of the STA 110-a may include, for example, the profile (e.g., BT profile), protocol (e.g., a controller stack or host stack BT protocol), and/or level of activity of a non-WLAN radio (e.g., actively transmitting vs. not active, such as in sleep mode) of the STA 110-a.

Figure 2:
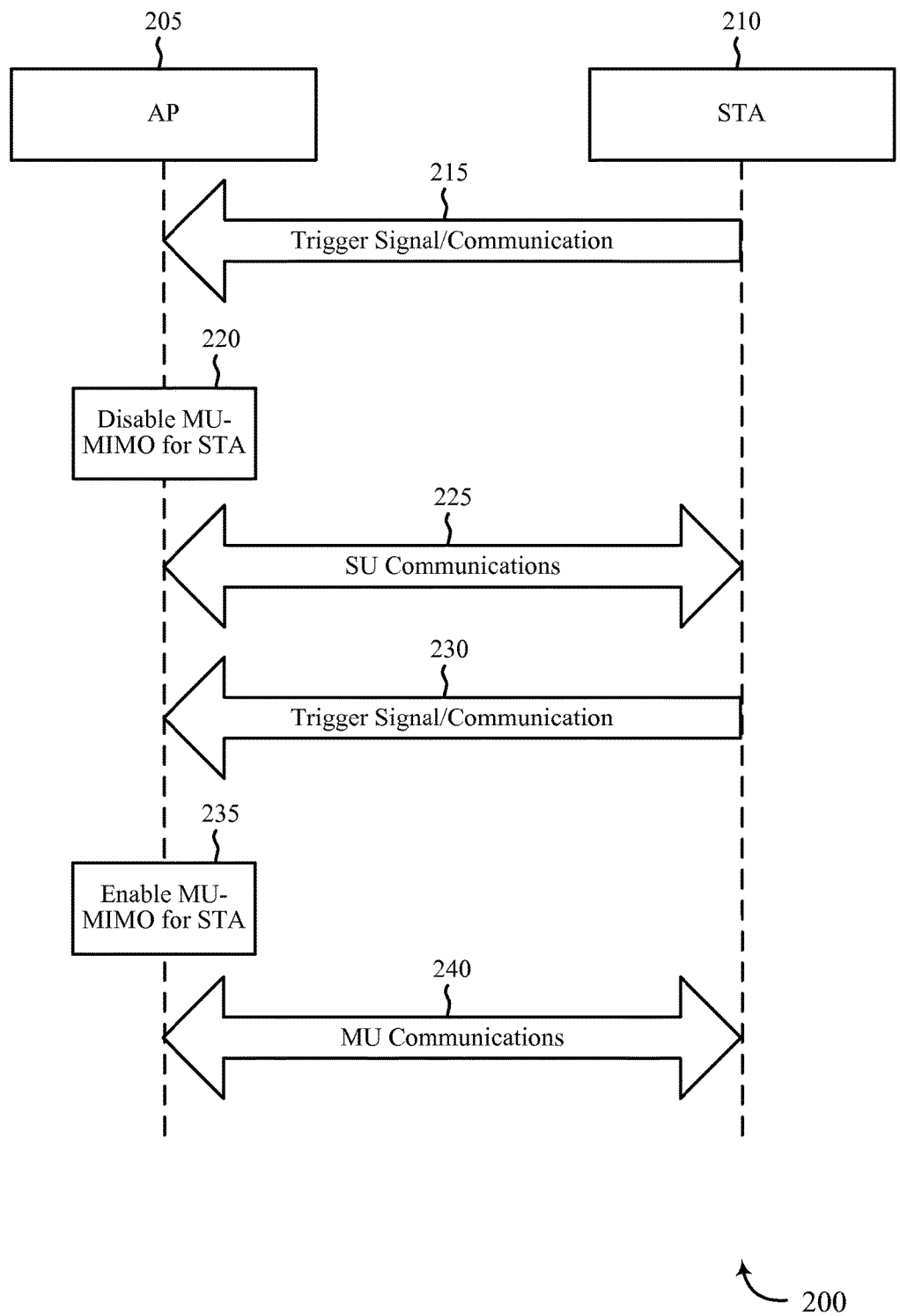
FIG. 2 shows a communication flow diagram that illustrates an example of communications and operations that may occur in accordance with various examples.

FIG. 2 shows a communication flow diagram 200 for wireless communication between two devices such as, e.g., those in FIG. 1. The system includes a first wireless communication device, AP 205, and a second wireless communication device, STA 210. The AP 205 may be an example of the AP 105 of FIG. 1. The STA 210 may be an example of the STA 110-a of FIG. 1.

The AP 205 may be configured to identify a change in a multiple RAT coexistence status of the STA 210 (e.g., coexistence of WLAN and BT). A change in the multiple RAT coexistence status of the STA 210 may include, for example, a change in a protocol (e.g., a controller stack or host stack BT protocol), profile (e.g., BT profile), or activity status (e.g., actively transmitting vs. sleep mode) of a non-WLAN radio of the STA 210. The coexistence change may be identified via a trigger signal or communication 215 received from the STA 210. The trigger signal or communication 215 may explicitly indicate the change in coexistence status of the STA 210, or alternatively, the trigger signal or communication 215 may provide information to the AP 205 from which the AP 205 may infer the change in coexistence status of the STA 210. For example, the signal or communication 215 may request enablement or disablement of a media access control (MAC) aggregation mode at the STA 210.

Alternatively or additionally, the signal or communication 215 may indicate operation (e.g., transmitting/receiving) of a different RAT (e.g., BT) at the STA 210 in a manner (e.g., mode of operation) that is not compatible with (e.g., disruptive to) MU-MIMO operation. For example, if BT is being used for a voice call over a BT headset using a synchronous connection oriented (SCO) or extended SCO (e-SCO) link, receptions and transmissions occur at fixed time intervals that leave insufficient time (e.g., 2.5 ms) available for MU-MIMO sounding and acknowledgement (e.g., BA) procedures. Thus, the AP 205 may determine that the STA 210 has changed status from using the different RAT (e.g., BT) in a manner (e.g., mode of operation) that is compatible with (e.g., not disruptive to) MU-MIMO operation to the incompatible use.

Based at least in part on a change in the multiple RAT coexistence status at the STA 210 (e.g., the AP 205 receives a trigger event or the AP 205 determines a trigger event, like activity by a STA 210 radio), the AP 205 may adjust its MU-MIMO wireless communication operation. In one embodiment, the AP 205 may disable MU-MIMO operation to the STA 210 at block 220 for the STA 210. Alternatively, the AP 205 may lower the throughput (e.g., change the MCS rate or narrow the channels for MU-MIMO) or temporarily disable MU-MIMO altogether. If MU-MIMO is disabled to STA 210, the AP 205 may then perform communications 225 with the STA 210 without MU operation, thereby avoiding potential negative effects on MU-MIMO communications between the AP 205 and other STAs (not shown).

The AP 205 may receive another trigger signal or communication 230 from the STA 210. In this example, the trigger signal or communication 230 may indicate that the STA 210 is using MAC aggregation or that the STA 210 is using BT in a manner that is compatible with (e.g., not disruptive to) MU-MIMO operation. For example, if BT is being used to stream media using Advanced Audio Distribution Profile (A2DP) over a BT headset, the BT communications may be relatively flexible and provide sufficient time (e.g., 30-40 ms) for MU-MIMO sounding and acknowledgement (e.g., BA) procedures.

Based at least in part on the identified coexistence status, the AP 205 may adjust its MU-MIMO wireless communication operation. In this case, the AP 205 may enable MU-MIMO operation (at block 235) for the STA 210. The AP 205 may then perform MU-MIMO communications 240 with the STA 210 and other STAs (not shown).

Figure 3:
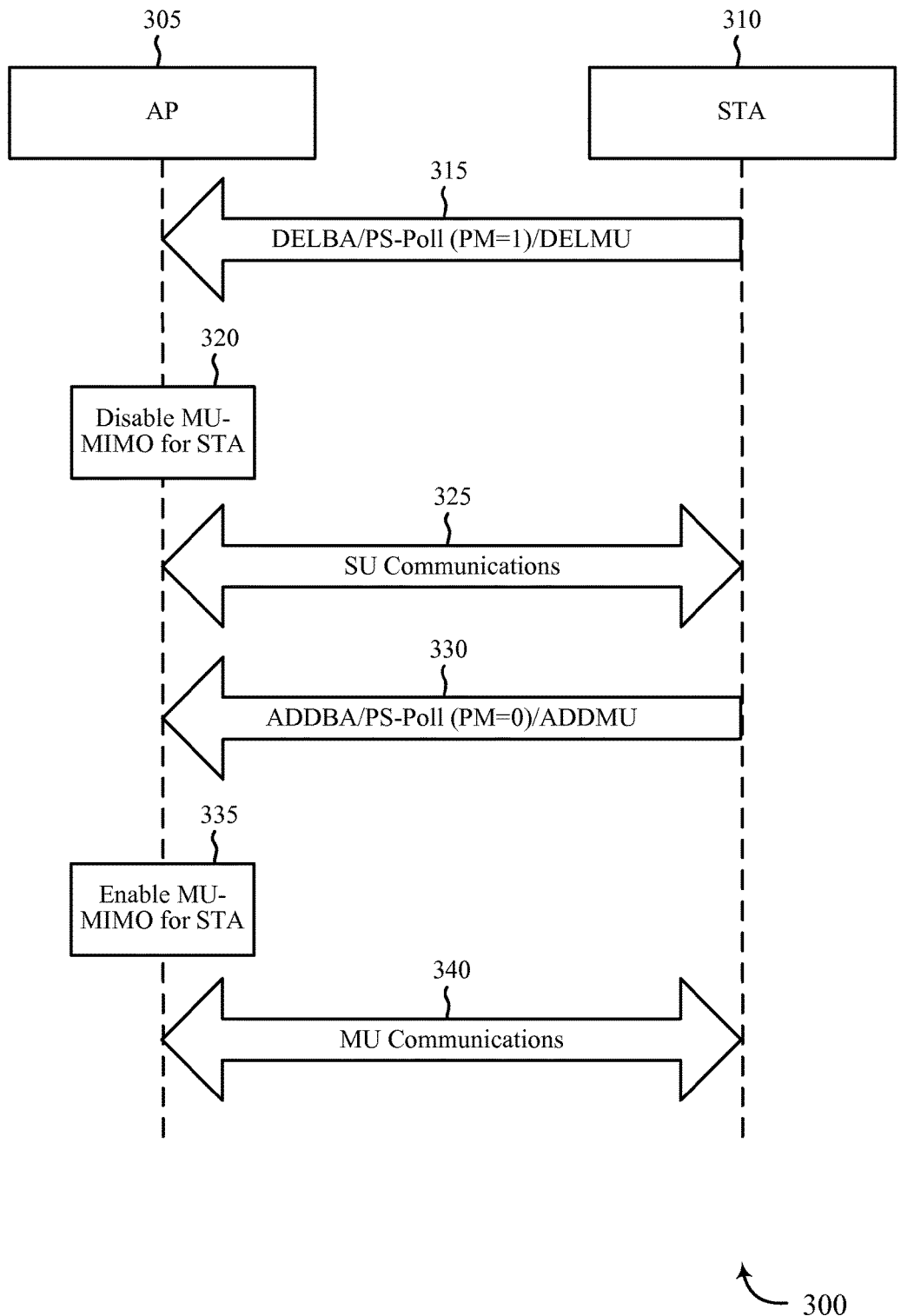
FIG. 3 shows a communication flow diagram that illustrates another example of communications and operations that may occur in accordance with various examples.

FIG. 3 shows another communication flow diagram 300 for wireless communication. FIG. 3 shows communication between a first wireless communication device, AP 305, and a second wireless communication device, STA 310. The AP 305 may be an example of the AP 105 of FIG. 1. The STA 310 may be an example of the STA 110-a of FIG. 1.

The AP 305 may be configured to identify a change in a multiple RAT coexistence status of the STA 310 (e.g., coexistence of WLAN and BT). In this example, the change may be identified via a trigger event such as a specific signal 315 received from the STA 310. For example, signal 315 may be a DELBA (delete block acknowledgement) action frame requesting that the AP 305 not use BA or MAC aggregation for the STA 310. This may be the case, for example, when the STA 310 uses clear-to-send-to-self (CTS2S) signals to shape downlink traffic to the STA 310 (e.g., if dealing with some legacy Wi-Fi clients in the 2.4 GHz spectrum of BSS). Alternatively, the signal 315 may be a NULL frame with power management (PM) bit set equal to one (PM=1), where PS-POLLs are used to shape downlink traffic to the STA 310. Further, the signal 315 may be a vendor specific action frame, such as a DELMU (delete MU) action frame, requesting that the AP 305 not use MU-MIMO for the STA 310.

The DELMU action frame, or request frame, may be sent from the STA 310 to the AP 305 to explicitly request the AP 305 to disable MU-MIMO operation for the STA 310. The DELMU request frame may include an information element (IE) that identifies the frame as a DELMU request frame and an IE that indicates a dialog token, a unique number for matching the request frame with a corresponding response frame. For example, the AP 305 may send a DELMU response frame to the STA 310 to explicitly confirm disablement of MU-MIMO operation for the STA 310. The DELMU response frame may include an IE that indicates the action frame type (DELMU response), an IE that indicates a dialog token that matches the dialog token of the corresponding DELMU request frame, and an IE that indicates a status code that indicates whether or not the request to disable MU-MIMO operation is accepted by the AP 305. For example, the AP 305 may set the status code IE to zero (0) if the AP 305 accepts the request to disable MU-MIMO operation. Although described as a vendor-specific action frame, the DELMU request frame or a similar request frame may alternatively be standardized across multiple vendors.

Based at least in part on such a change, the AP 305 may adjust its MU-MIMO wireless communication operation. In this case, the AP 305 may disable MU-MIMO operation at block 320 for the STA 310. The AP 305 may then perform communications 325 with the STA 310 without MU operation, thereby avoiding potential negative effects on MU-MIMO communications between the AP 305 and other STAs (not shown).

The AP 305 may receive another specific signal 330 from the STA 310. For example, the signal 330 may be a ADDBA (add block acknowledgement) action frame requesting that the AP 305 use BA or MAC aggregation for the STA 310. Alternatively, the signal 330 may be a Data or NULL frame with PM bit set equal to zero (PM=0). Further, the signal 330 may be a vender specific action frame such as ADDMU (add MU), requesting that the AP 305 use MU-MIMO for the STA 310.

The ADDMU action frame, or request frame, may be sent from the STA 310 to the AP 305 to explicitly request the AP 305 to enable MU-MIMO operation for the STA 310. The ADDMU request frame may include an information element (IE) that indicates the type of action frame (i.e., identifying the frame as an ADDMU action frame) and an information element (IE) that indicates a dialog token. The dialog token may be a unique number for matching the request frame with a corresponding response frame. For example, the AP 305 may send an ADDMU response frame to the STA 310 to explicitly confirm enablement of MU-MIMO operation for the STA 310. The ADDMU response frame may include an IE that indicates the action frame type (ADDMU response), an IE that indicates a dialog token that matches the dialog token of the corresponding ADDMU request frame, and an IE that indicates a status code that indicates whether or not the request to enable MU-MIMO operation is accepted by the AP 305. For example, the AP 305 may set the status code IE to zero (0) if the AP 305 accepts the request to enable MU operation. Although described herein as a vendor-specific action frame, the ADDMU request frame or a similar request frame may alternatively be standardized across vendors.

Based at least in part on the identified change in the multiple RAT coexistence status, the AP 305 may adjust its MU-MIMO wireless communication operation. In this case, the AP 305 may enable MU-MIMO operation at block 335 for the STA 310. The AP 305 may then perform MU-MIMO communications 340 with the STA 310 and other STAs (not shown).

In the case of using BT with advanced audio distribution profile (A2DP) or object push profile (OPP), for example, the STA 310 may send a NULL frame with the PM bit set equal to 1 (PM=1), where NULL frames are used to shape downlink traffic to the STA 310. This may indicate to the AP 305 that the STA 310 is not able to receive any WLAN frames, and thus should be excluded for MU-MIMO operation. After BT at the STA 310 is done transmitting packets, the STA 310 may send another NULL frame with the PM bit set equal to 0 (PM=0). This may indicate to the AP 305 that the STA 310 is able to receive WLAN frames, and thus may be included for MU-MIMO operation.

It should be understood that the formats for the vendor-specific action frames may vary from the foregoing description without altering their functionality.

Figure 4:
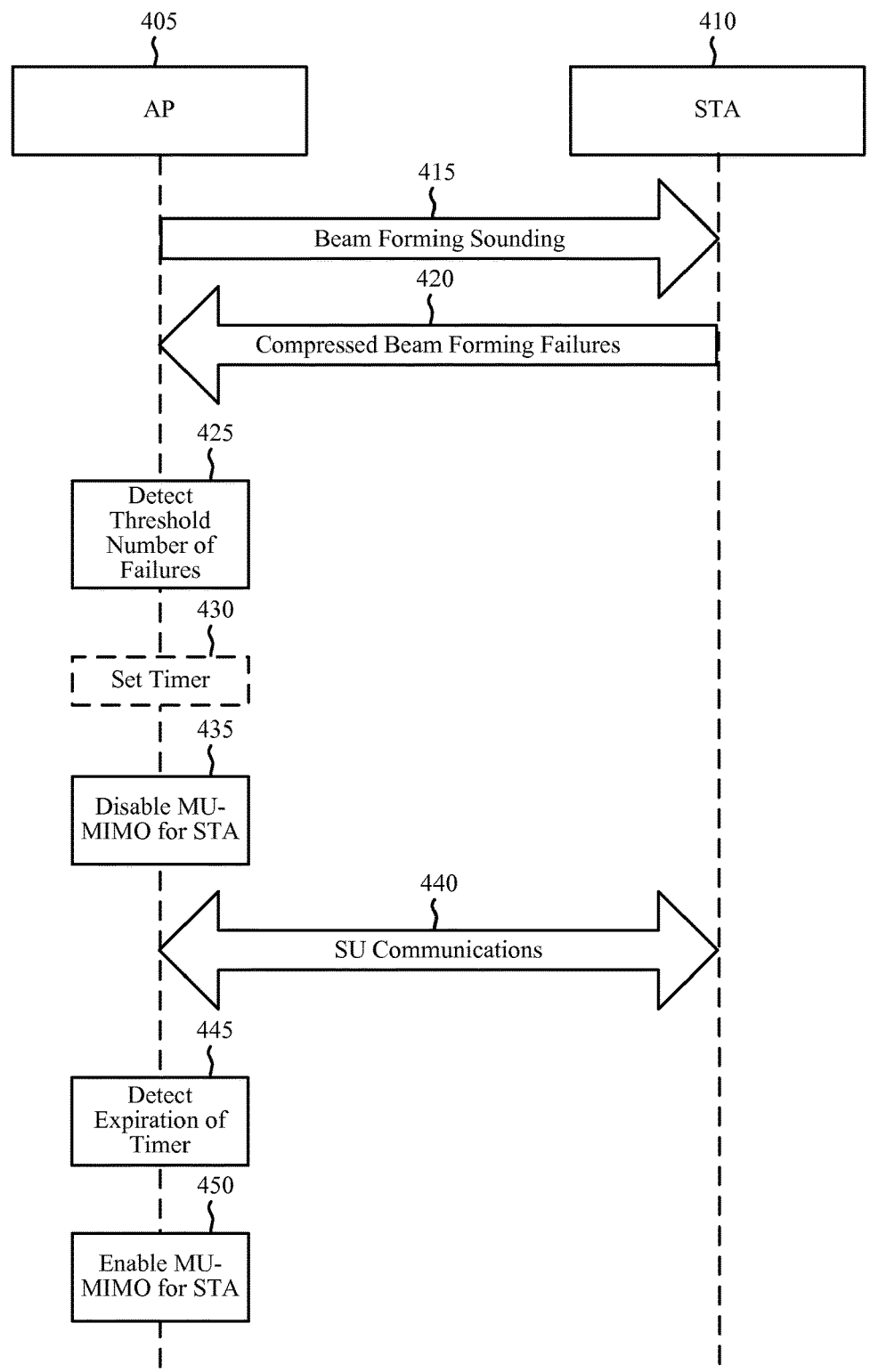
FIG. 4 shows a communication flow diagram that illustrates yet another example of communications and operations that may occur in accordance with various examples.

FIG. 4 shows another communication flow diagram 400 for wireless communication. FIG. 4 shows communication between a first wireless communication device, AP 405, and a second wireless communication device, STA 410. The AP 405 may be an example of the AP 105 of FIG. 1. The STA 410 may be an example of the STA 110-a of FIG. 1.

The AP 405 may perform beam forming sounding 415 with the STA 410. When the STA 410 is using BT in a manner that is not compatible with (e.g., disruptive to) MU-MIMO operation, the STA 410 may return signals 420 indicating compressed beam forming (CBF) failures in response to the sounding 415. Alternatively, the STA 410 may not return signals in response to the sounding 415, but may indicate CBF failures by a lack of acknowledgement of sounding communications from the AP 405.

The AP 405 may identify the CBF failures as a trigger event that indicates a change in a multiple RAT coexistence status of the STA 410 (e.g., coexistence of WLAN and BT). For example, the AP 405 may detect, at block 425, a threshold number of CBF failures from the STA 410 to trigger the AP 405 to disable MU-MIMO operation at block 435 for the STA 410. The AP 405 may then perform single user (SU)-MIMO communications 440 with the STA 410 and other STAs.

As shown, the AP 405 may set a timer, at block 430, based at least in part on the coexistence change. For example, the AP 405 may set a duration of the timer based at least in part on a number of CBF failures occurring since a previous timer expiration. A greater number of CBF failures occurring since expiration of the previous timer may result in a longer duration for the current timer.

The AP 405 may detect an expiration of the timer at block 445. Based at least in part on the detection, the AP 405 may reverse the previous adjustment of the MU-MIMO wireless communication operation (e.g., enable MU-MIMO operation at block 450 for the STA 410).

In general, the operations of 1) detecting an expiration of a timer that is set based at least in part on the coexistence change and 2) reversing the adjustment of the MU-MIMO wireless communication operation based at least in part on the detected expiration of the timer may be used in other scenarios as well. For example, these operations may be employed when a timing of disruptive coexistence communications is either known or deterministic. For example, certain RAT communication modes or protocols may define or otherwise have a certain time in which a set of communications may be performed. The timer may be set based at least in part on the change in coexistence status (e.g., the mode or protocol of the BT radio of the STA 410) such that the communications are completed at least by the expiration of the timer. Thus, when the timer expires, the adjustment of the MU-MIMO wireless communication operation may be reversed without risking disruption of MU-MIMO communications or underutilization of MU-MIMO.

Figure 5A:
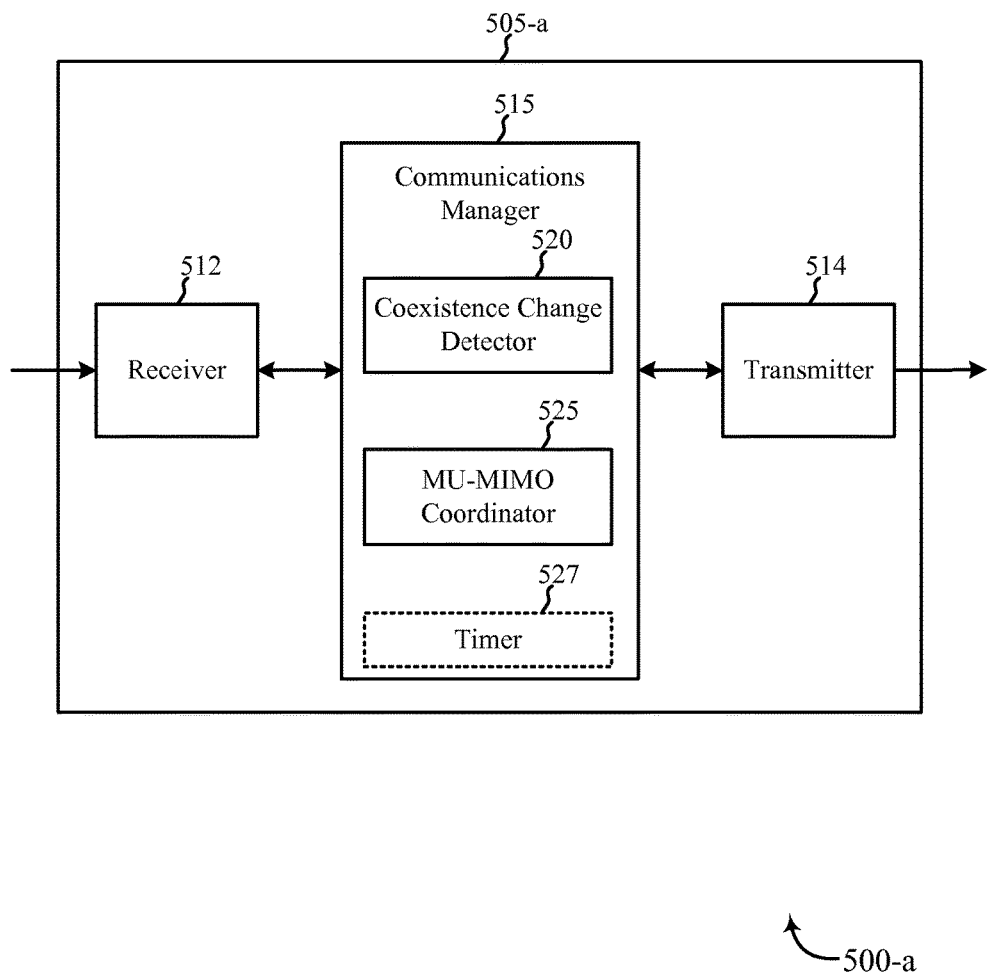
FIGS. 5A, 5B and 5C show block diagrams of examples of wireless devices that may be employed in wireless communications systems in accordance with various examples.

FIG. 5A shows a block diagram illustrating a device 500-a configured for wireless communication in accordance with various examples. The device 500-a may be an AP 505-a, which may be an example of the AP 105 of FIG. 1 or the AP 205, 305 or 405 of FIGS. 2, 3 and 4. In some examples, the device 500-a may be a processor.

The device 500-a may include a receiver 512, a transmitter 514 and a communications manager 515. The receiver 512 may receive signals from STAs 110, such as described above with respect to FIG. 1. Further, the receiver 512 may receive signals/communications from STAs 210, 310 or 410, such as described with respect to FIGS. 2, 3 and 4. The transmitter 514 may transmit signals to STAs 110, such as described above with respect to FIG. 1. In particular, the transmitter 514 may be configured to implement MU-MIMO communications with the STAs 110, as well as non-MU communications.

The communications manager 515 may perform operations, or parts of operations, of the WLAN 100 described above in FIG. 1. Further, the communications manager 515 may perform various operations described above for the communication flows in FIG. 2, 3 or 4.

Although shown as separate entities, the receiver 512, the transmitter 514 and the communications manager 515 may be combined into one or multiple entities within the device 500-a. For example, the receiver 512 and the transmitter 514 may be subcomponents of a transceiver, which may incorporate the capabilities of the communications manager 515.

The communications manager 515 may include a coexistence change detector 520 and an MU-MIMO coordinator 525. The coexistence change detector 520 may detect that a STA (not shown) has undergone a change in multiple RAT coexistence status. As described above, for example, the change in coexistence status may be conveyed by a trigger event and may be a BT radio of the STA going from an inactive state (e.g., not actively transmitting) to an active state (e.g., actively transmitting), or vice versa. Alternatively, the change may be from BT operation that is compatible with MU-MIMO operation to BT operation that is incompatible with MU-MIMO operation, or vice versa.

The coexistence change detector 520 may be configured to identify information from signals received (e.g., and decoded) by the receiver 512. For example, the coexistence change detector 520 may recognize a request received from the STA for the device 500-a to enable/disable MU-MIMO communication with the STA. Alternatively, the coexistence change detector 520 may be able to detect enablement/disablement of a MAC aggregation mode at the STA. This detection may be based on receipt of explicit signaling, such as ADDBA/DELBA action frames received from the STA, or inferred from other information received or observed by the AP 505-a. Further, the coexistence change detector 520 may be able to identify the value of a PM bit received from the STA (e.g., as part of a PS-POLL or a NULL frame).

Based at least in part on the coexistence change identified by the coexistence change detector 520, the MU-MIMO coordinator 525 may adjust an MU-MIMO wireless communication operation for the STA with the coexistence change at the device 500-a. As described herein, such adjustment may involve enabling or disabling MU-MIMO communication between the device 500-a and the STA. Thus, the MU-MIMO coordinator 525 may manage MU-MIMO communications with multiple STAs by determining which STAs to include and which STAs to exclude for such communications.

In the case described above in the communication flow diagram 400 of FIG. 4, the coexistence change detector 520 may detect and sum CBF failures (messages received from the STA or lack of acknowledgements) in response to communications of a sounding procedure sent by the device 500-a to the STA. The coexistence change detector 520 thus may determine when the number of CBF failures reaches a threshold value (e.g., by comparing the cumulative number of CBF failures to a threshold).

When the coexistence change detector 520 determines that the number of CBF failures has reached the threshold value, the MU-MIMO coordinator 525 may adjust an MU-MIMO wireless communication operation at the device 500-a. For example, the MU-MIMO coordinator 525 may disable MU-MIMO communication between the device 500-a and the STA. As stated above, in some embodiments, the MU-MIMO communication is disabled only for the STA, thus not disabling MU-MIMO communication by the AP with other STAs in the BSS.

Further, the communications manager 515 also may include a timer 527. The coexistence change detector 520, or the communications manager 515, may set the timer 527 based at least in part on the coexistence change (e.g., based on determining the number of CBF failures has reached the threshold value). As noted above, however, the timer 527 may be separate from the device 500-a. For example, the timer 527 may be included in the STA and set by the STA. The coexistence change detector 520 also may determine a total number of CBF failures which may be used to determine a duration of a subsequent instance of the timer 527, whether or not the device 500-a includes the timer 527.

In some embodiments, the timer is used to temporarily alter communications to the STA. Therefore, the communications manager 515 may detect an expiration of the timer 527 and may reverse the adjustment of the MU-MIMO wireless communication operation. For example, the MU-MIMO coordinator 525 may enable MU-MIMO communication between the device 500-a and the impacted STA.

Figure 5B:
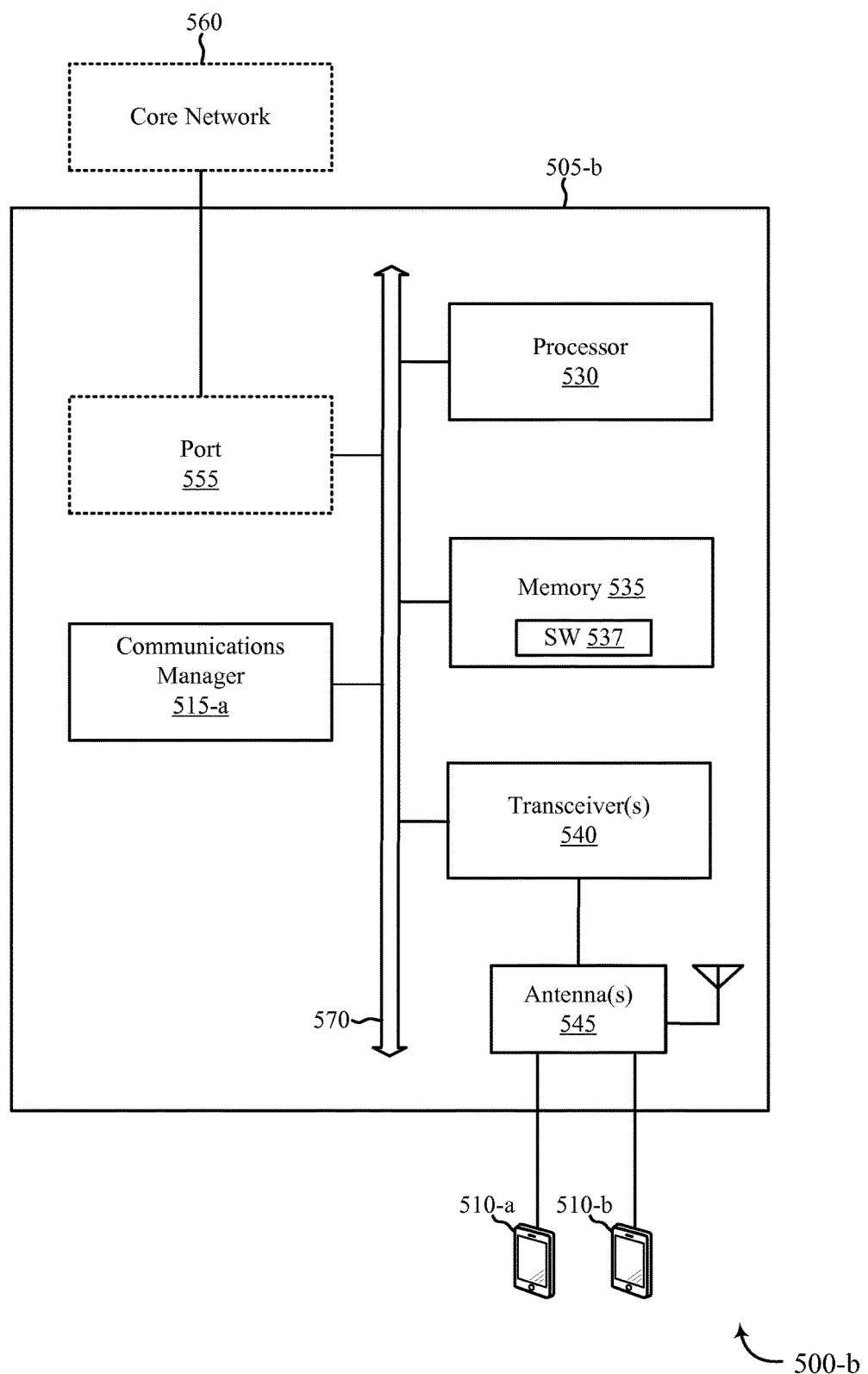

FIG. 5B shows a block diagram of a device 500-b configured for wireless communication in accordance with various examples. The device 500-b may be an AP 505-b, which may be an example of the AP 105 of FIG. 1, the AP 205, 305 or 405 of FIGS. 2, 3 and 4, or the AP 505-a of FIG. 5A.

The device 500-b may include components for bi-directional voice and data communications including components for transmitting communications and components for receiving communications. For example, the device 500-b may communicate bi-directionally with STAs 510-a and 510-b via one or more transceivers 540 and one or more antennas 545. Further, the device 500-b may communicate bi-directionally with a core network 560 via a port 555 or other suitable hardware (e.g., a backhaul). The device 500-b also may communicate bi-directionally with other APs (not shown).

As illustrated, the device 500-a may include a processor 530, a memory 535 (storing software (SW) 537), the transceiver(s) 540 and the antenna(s) 545, each of which may communicate, directly or indirectly, with one another (e.g., via a bus 570). The transceiver(s) 540 may communicate bi-directionally, via the antenna(s) 545 or wired or wireless links, with one or more networks, as described above. The transceiver(s) 540 may include a modem to modulate packets and provide the modulated packets to the antenna(s) 545 for transmission, and to demodulate packets received from the antenna(s) 545. While the device 500-*b* may include a single antenna, the device 500-*b* also may have multiple antennas capable of concurrently transmitting or receiving multiple wireless transmissions (e.g., via MU-MIMO operation).

The memory 535 may include random access memory (RAM) and read only memory (ROM). The memory 535 may store computer-readable, computer-executable software/firmware code 537 including instructions that, when executed, cause the processor 530 to implement various features described herein (e.g., identifying a coexistence change, adjusting a MU-MIMO wireless communication operation, etc.). Alternatively, the computer-executable software/firmware code 537 may not be directly executable by the processor 530 but may cause a computer (e.g., when compiled and executed) to implement features described herein. The processor 530 may include an intelligent hardware device, (e.g., a central processing unit (CPU), a microcontroller, an application-specific integrated circuit (ASIC), etc.).

The device 500-*a* also may include a communications manager 515-*a*, which may be in communication with the other components via the bus 570. The communications manager 515-*a* may be an example of the communications manager 515 of FIG. 5A. Thus, the communications manager 515-*a* may include similar subcomponents as shown in FIG. 5A, or may otherwise be configured to perform similar operations as described with respect to FIG. 5A.

The communications manager 515-*a* or subcomponents thereof may, individually or collectively, be implemented with at least one ASIC adapted to perform some or all of the applicable features in hardware. Alternatively, the features of these components may be implemented by one or more other processing units (or cores), on at least one integrated circuit (IC). Other types of integrated circuits may also be used (e.g., Structured/Platform ASICs, a field-programmable gate array (FPGA), or another semi-custom IC), which may be programmed in any manner known in the art. The features of each unit may also be implemented, in whole or in part, with instructions embodied in a memory, formatted to be executed by one or more general or application-specific processors.

The communications manager 515-*a* may detect a coexistence change (e.g., a trigger event) that indicates that a STA (not shown) has undergone a change in multiple RAT coexistence status, such as described above with respect to the communications manager 515 of FIG. 5A. The communications manager 515-*a* may detect coexistence changes, either directly or indirectly (e.g., as described herein, using information from signals received by the transceiver(s) 540 from the STA). Based at least in part on the coexistence change, the communications manager 515-*a* may adjust an MU-MIMO wireless communication operation at the device 500-*b*, as described herein. Thus, the communications manager 515-*a* may manage MU-MIMO communications with multiple STAs by determining which STAs to include and which STAs to exclude for such communications. The communications manager 515-*a* may perform (e.g., in conjunction with the processor 530, the memory 535, the transceiver(s) 540 and the antenna(s) 545) various operations described above in the communication flow diagrams 200, 300 or 400 of FIGS. 2, 3 and 4.

Figure 5C:
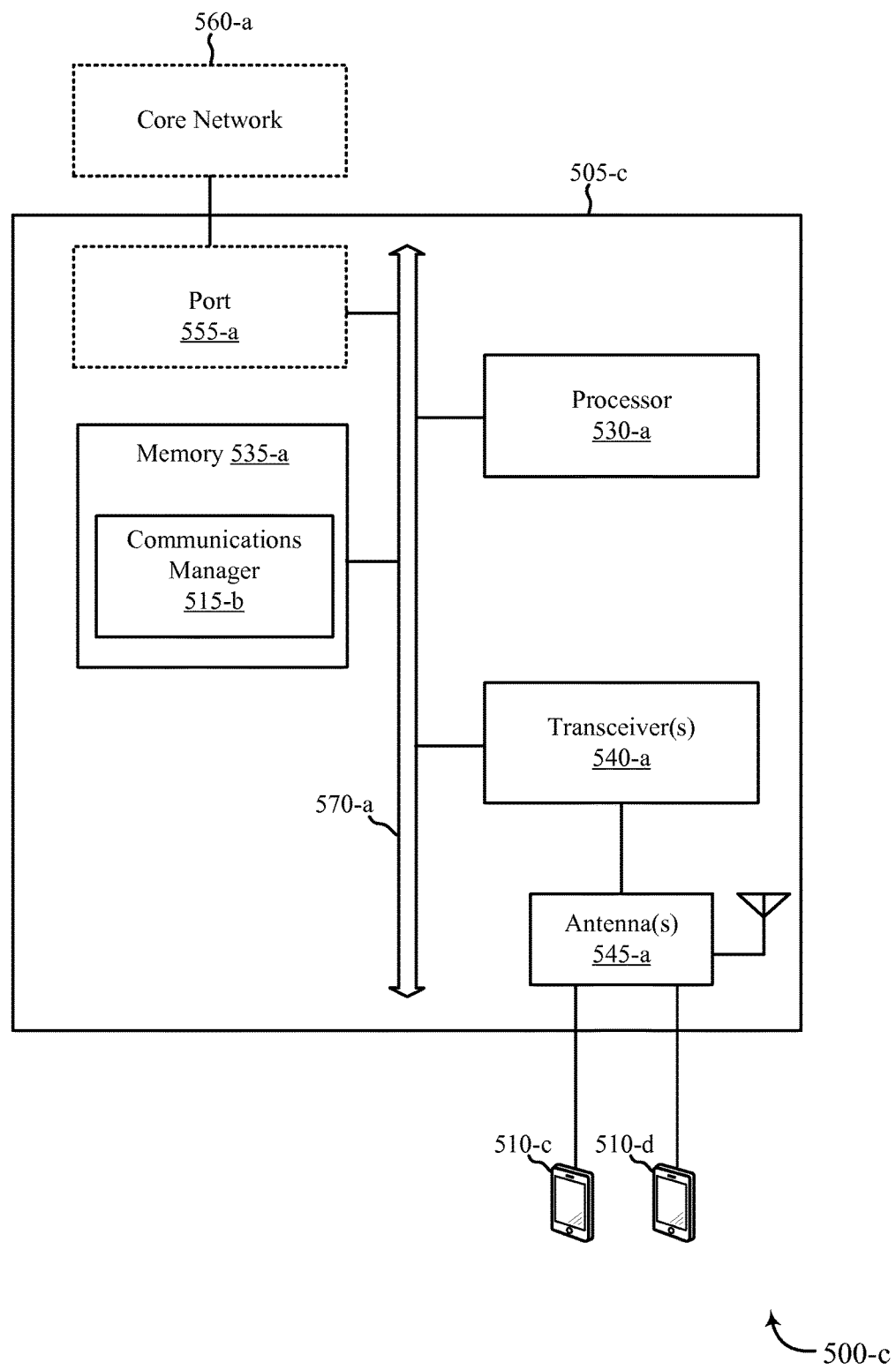

FIG. 5C shows a diagram of a device 500-*c* configured for wireless communication in accordance with various examples. The device 500-*c* may be an AP 505-*c*, which may be an example of the AP 105 of FIG. 1, the AP 205, 305 or 405 of FIGS. 2, 3 and 4, the AP 505-*a* of FIG. 5A, or the AP 505-*b* of FIG. 5B.

The device 500-*c* may include a processor 530-*a*, a memory 535-*a*, one or more transceiver(s) 540-*a*, and one or more antenna(s) 545-*a*, each of which may communicate, directly or indirectly, with one another (e.g., via a bus 570-*a*). The transceiver(s) 540-*a* may communicate bi-directionally, via the antenna(s) 545-*a* or wired or wireless links, with one or more networks, as described above. For example, the device 500-*c*, via the transceiver(s) 540-*a* and the antenna(s) 545-*a*, may communicate bi-directionally with STAs 510-*c* and 510-*d*. Further, the device 500-*c* may communicate bi-directionally with a core network 560-*a* via a port 555-*a* or other suitable hardware (e.g., a backhaul). The device 500-*c* also may communicate bi-directionally with other APs (not shown). The transceiver(s) 540-*a* and the antenna(s) 545-*a* may be configured as described above with respect to FIG. 5B.

The memory 535-*a* may include RAM and ROM. The memory 535-*a* may store computer-readable, computer-executable software/firmware code including instructions that, when executed, cause the processor 530-*a* to implement various features described herein (e.g., identifying a change in a multiple RAT coexistence status, adjusting a MU-MIMO wireless communication operation, etc.). Alternatively, the software/firmware code may not be directly executable by the processor 530-*a* but may cause a computer (e.g., when compiled and executed) to implement features described herein. The processor 530-*a* may include an intelligent hardware device, (e.g., a CPU, a microcontroller, an ASIC, etc.). In the example of FIG. 5C, the communications manager 515-*b* may be implemented as software/firmware code executable by the processor 530-*a*.

The components of the devices 500-*a*, 500-*b* and/or 500-*c* may be, individually or collectively, implemented with an ASIC adapted to implement some or all of the applicable features in hardware. In other examples, the features of devices 500-*a*, 500-*b* and/or 500-*c* may be implemented by a processing unit (or core), on an IC. In other examples, other types of integrated circuits are used (e.g., Structured/Platform ASICs, FPGAs, and other Semi-Custom ICs), which may be programmed in any manner known in the art. The features of each unit may also be implemented, in whole or in part, with instructions embodied in a memory, formatted to be executed by a general or application-specific processor.

Figure 6A:
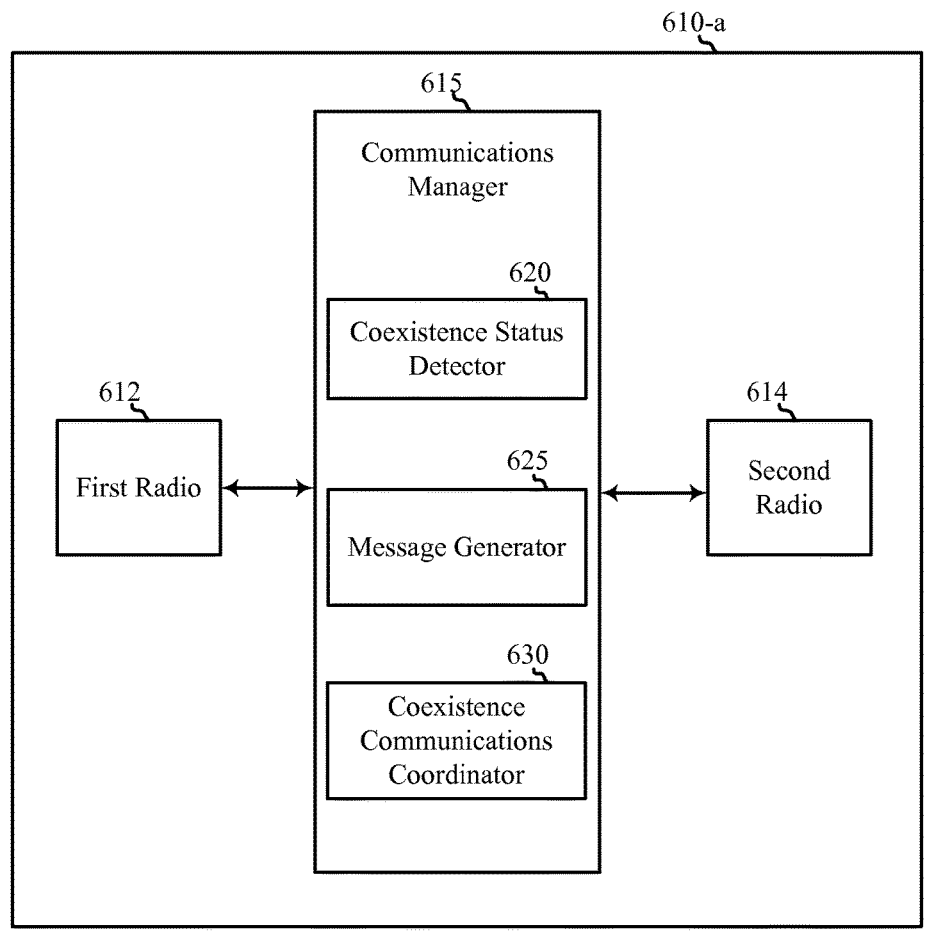
FIGS. 6A, 6B and 6C show block diagrams of examples of wireless devices configured for wireless communication in accordance with various examples.

FIG. 6A shows a block diagram illustrating a device 600-*a* configured for wireless communication in accordance with various examples. The device 600-*a* may be a STA 610-*a*, which may be an example of the STAs 110 of FIG. 1 or the STA 210, 310 or 410 of FIGS. 2, 3 and 4. The STA 610-*a* may be any of a variety of devices or device configurations, such as but not limited to personal computers (e.g., laptop computers, netbook computers, tablet computers, etc.), cellular telephones, PDAs, smartphones, digital video recorders (DVRs), internet appliances, gaming consoles, e-readers, etc. The STA 610-*a* may also have an internal power supply (not shown), such as a battery, to facilitate mobile operation. In some examples, the device 600-*a* may be a processor.

The device 600-*a* may include a first radio 612, a second radio 614 and a communications manager 615. The first radio 612 may be configured to operate according to a first RAT (e.g., WLAN), and the second radio 614 may be configured to operate according to a second different RAT (e.g., BT, LTE, etc.). As such, the first radio 612 may allow the device 600-*a* to communicate bi-directionally with an AP (not shown), and the second radio 614 may allow the device 600-*a* to communicate bi-directionally with other devices (such as the peripheral devices 130, 140 of FIG. 1), such as described above with respect to FIG. 1. Further, the first radio 612 may allow the device 600-*a* to transmit signals/communications to the APs 205, 305 or 405, such as described with respect to FIGS. 2, 3 and 4. In particular, the first radio 612 may be compatible for implementing MU-MIMO communications with the AP 105, as well as non-MU communications.

The communications manager 615 may perform operations, or parts of operations, of the WLAN 100 described above in FIG. 1. Further, the communications manager 615 may perform various operations described above for the communication flows in FIG. 2, 3 or 4.

The communications manager 615 may include a coexistence status detector 620, a message generator 625, and a coexistence communications coordinator 630. The coexistence status detector 620 may detect, determine or otherwise identify when the device 600-*a* has undergone a change in multiple RAT coexistence status. As described above, for example, the change in coexistence status may be the second radio 614 of the device 600-*a* going from an inactive state (e.g., not actively transmitting) to an active state (e.g., actively transmitting), or vice versa. Alternatively, the change may be the second radio 614 of the device going from a mode that is compatible with MU-MIMO operation to a mode that is incompatible with MU-MIMO operation, or vice versa.

The message generator 625 may be configured to generate or otherwise obtain a message to be sent to the AP that indicates the change in coexistence status determined by the coexistence status detector 620. The message may be sent to the AP via the first radio 612 so that the AP may identify, detect or otherwise determine that the change in coexistence status of the device 600-*a* has occurred, and adjust an MU-MIMO wireless communication operation at the AP based at least in part on the change in coexistence status of the device 600-*a*. The message sent to the AP may comprise a signal including information related to the change in coexistence status of the device 600-*a*. For example, the message may be a request for the AP to enable/disable MU-MIMO communication with the device 600-*a*. Alternatively, the message may indicate that a MAC aggregation mode is enabled/disabled at the device 600-*a*. Further, the message may be a PS-POLL or a NULL frame that includes a PM bit set to a particular value (zero or one).

The coexistence communications coordinator 630 may manage communications via the first and second radios 612, 614 so that the different RATs may operate concurrently. In particular, the coexistence communications coordinator 630 may facilitate communications between the first radio 612 and the AP according to MU-MIMO operation of the AP when the second radio 614 is not actively transmitting/receiving or is operating in a manner that is compatible with (e.g., not disruptive to) MU-MIMO operation of the AP.

In the case described above in the communication flow diagram 400 of FIG. 4, the message generator 625 may be configured to generate messages indicating CBF failures in response to a sounding procedure performed by the AP. The first radio 612 may receive communications from the AP for the sounding procedure, and may transmit the failure messages in response. Alternatively, the device 600-*a* may not generate a message in response to such communications. In this case, the lack of acknowledgements from the device 600-*a* in response to the sounding procedure communications may indicate CBF failures to the AP. As described above, the AP may adjust an MU-MIMO wireless communication operation at the AP for communications with the device 600-*a* based on CBF failures.

Although not shown, the device 600-*a* may include a timer. The communications manager 615 may set the timer based at least in part on the sounding procedure performed by the AP (e.g., based on receiving a threshold number of sounding procedure communications or messages sent in response). In this case, the message generator 625 may generate a message upon expiration of the timer. Such message may be sent to the AP via the first radio 612 and may indicate to the AP that the timer has expired. As described above, the AP may reverse the adjustment of the MU-MIMO wireless communication operation based at least in part on the expiration of the timer (e.g., based at least in part on the message from the device 600-*a*).

Figure 6B:
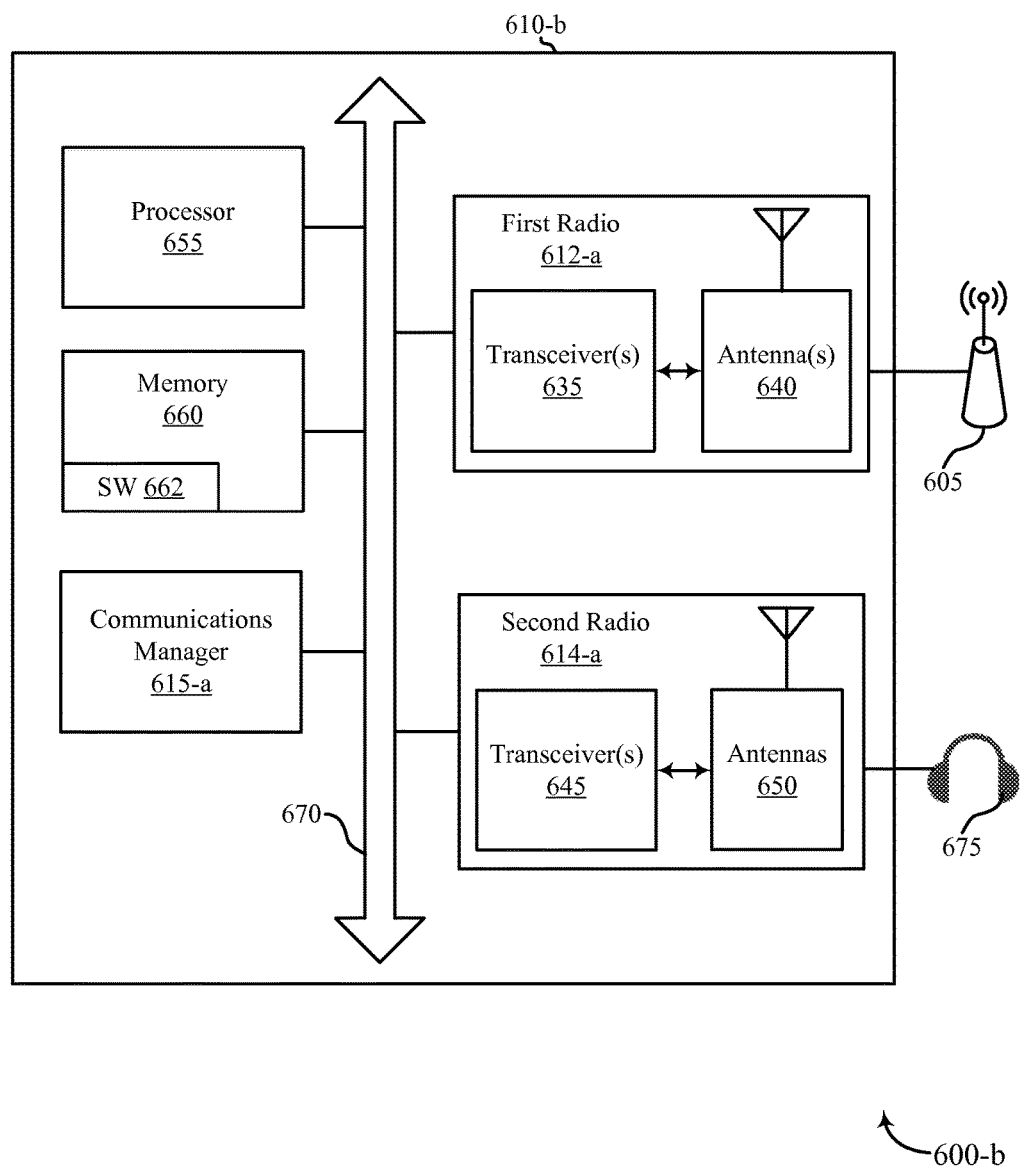

FIG. 6B shows a block diagram of a device 600-*b* configured for wireless communication in accordance with various examples. The device 600-*b* may be a STA 610-*b*, which may be an example of the STAs 110 of FIG. 1, the STA 210, 310 or 410 of FIGS. 2, 3 and 4, or the STA 610-*a* of FIG. 6A.

The device 600-*b* may include a first radio 612-*a* and a second radio 614-*a*. The first radio 612-*a* may be configured to operate as described above with respect to the first radio 612 of FIG. 6A, and the second radio 614-*a* may be configured to operate as described above with respect to the second radio 614 of FIG. 6A. As such, the first radio 612-*a* may allow the device 600-*b* to communicate bi-directionally with an AP 605, and the second radio 614-*a* may allow the device 600-*b* to communicate bi-directionally with a non-WLAN device, such as the BT headset 675 illustrated. The first radio 612-*a* may include one or more transceiver(s) 635 and one or more antenna(s) 640. Similarly, the second radio 614-*a* may include one or more transceiver(s) 645 and one or more antenna(s) 650. The transceiver(s) 635, 645 may communicate bi-directionally, via the antenna(s) 640, 650 or wired or wireless links, with one or more networks, as described above. The transceiver(s) 635, 645 may include a modem to modulate packets and provide the modulated packets to the antenna(s) 640, 650 for transmission, and to demodulate packets received from the antenna(s) 640, 650. While each of the radios 612-*a*, 614-*a* may include a single antenna 640, 650, each of the radios 612-*a*, 614-*a* also may have multiple antennas 640, 650 capable of concurrently transmitting or receiving multiple wireless transmissions.

As illustrated, the device 600-*b* may include a processor 655 and a memory 660 (storing software (SW) 662), each of which may communicate, directly or indirectly, with one another and the first and second radios 612-*a*, 614-*a* (e.g., via a bus 670).

The memory 660 may include RAM and ROM. The memory 660 may store computer-readable, computer-executable software/firmware code 662 including instructions that, when executed, cause the processor 655 to implement various features described herein (e.g., detect when the device 600-*b* has undergone a change in multiple RAT coexistence status, etc.). Alternatively, the computer-executable software/firmware code 662 may not be directly executable by the processor 655 but may cause a computer (e.g., when compiled and executed) to implement features described herein. The processor 655 may include an intelligent hardware device, (e.g., a CPU, a microcontroller, an ASIC, etc.).

The device 600-b also may include a communications manager 615-a, which may be in communication with the other components via the bus 670. The communications manager 615-a may be an example of the communications manager 615 of FIG. 6A. The communications manager 615-a may be configured to perform operations as described above with respect to the communications manager 615 of FIG. 6A, and may include various subcomponents such as those described above with respect to the communications manager 615 of FIG. 6A to carry out operations such as described above. Thus, the communications manager 615-a may: detect, determine or otherwise identify when the device 600-b has undergone a change in multiple RAT coexistence status; generate or otherwise obtain a message to be sent to the AP that indicates the change in coexistence status; and, manage communications via the first and second radios 612-a, 614-a so that the different RATs may operate concurrently. In particular, the communications manager 615-a may facilitate communications between the first radio 612-a and the AP according to MU-MIMO operation of the AP when the second radio 614-a is not actively transmitting/receiving or is operating in a manner that is compatible with (e.g., not disruptive to) MU-MIMO operation of the AP.

The communications manager 615-a or subcomponents thereof may, individually or collectively, be implemented with at least one ASIC adapted to implement some or all of the applicable features in hardware. Alternatively, the features of these components may be implemented by one or more other processing units (or cores), on at least one IC. Other types of integrated circuits may also be used (e.g., Structured/Platform ASICs, an FPGA, or another semi-custom IC), which may be programmed in any manner known in the art. The features of each unit may also be implemented, in whole or in part, with instructions embodied in a memory, formatted to be executed by one or more general or application-specific processors.

The communications manager 615-a may implement (e.g., in conjunction with the processor 655, the memory 660, and the first radio 612-a) may perform various operations described above in the communication flow diagrams 200, 300 or 400 of FIGS. 2, 3 and 4.

Figure 6C:
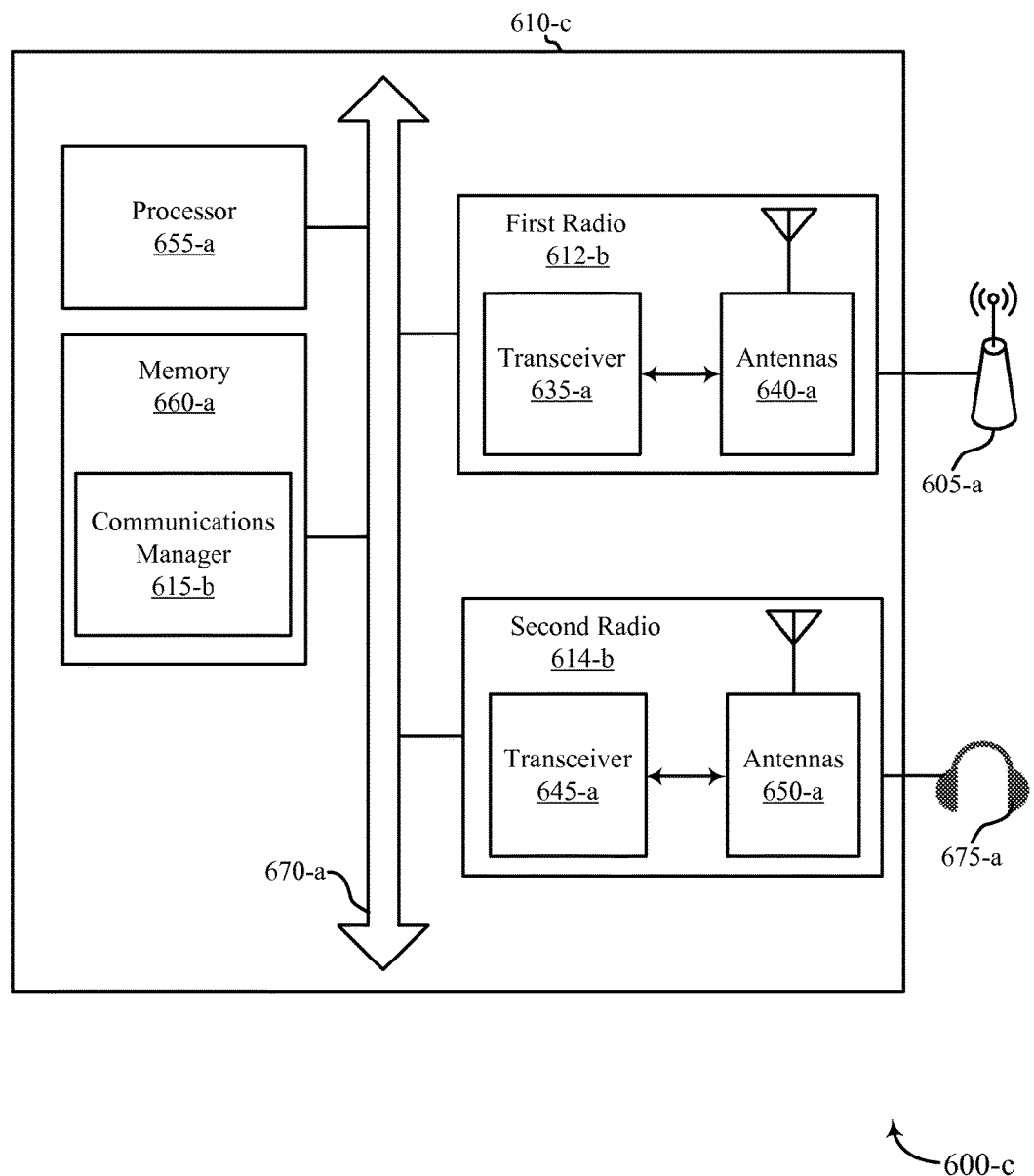

FIG. 6C shows a diagram of a device 600-c configured for wireless communication in accordance with various examples. The device 600-c may be a STA 610-c, which may be an example of the STAs 110 of FIG. 1, the STA 210, 310 or 410 of FIGS. 2, 3 and 4, the STA 610-a of FIG. 6A, or the STA 610-b of FIG. 6B.

The device 600-c may include a processor 655-a, a memory 660-a, a first radio 612-b, and a second radio 614-b, each of which may communicate, directly or indirectly, with one another (e.g., via a bus 670-a). The first radio 612-b may be configured to operate as described above with respect to the first radio 612 of FIG. 6A, and the second radio 614-b may be configured to operate as described above with respect to the second radio 614 of FIG. 6A. As such, the first radio 612-b may allow the device 600-c to communicate bi-directionally with an AP 605-a, and the second radio 614-b may allow the device 600-c to communicate bi-directionally with a non-WLAN device, such as the BT headset 675-a illustrated. The first radio 612-b may include one or more transceiver(s) 635-a and one or more antenna(s) 640-a. Similarly, the second radio 614-b may include one or more transceiver(s) 645-a and one or more antenna(s) 650-a.

The transceiver(s) 635-a, 645-a and the antenna(s) 640-a, 650-a may be configured as described above with respect to FIG. 6B.

The memory 660-a may include RAM and ROM. The memory 660-a may store computer-readable, computer-executable software/firmware code including instructions that, when executed, cause the processor 655-a to implement various features described herein (e.g., detect when the device 600-c has undergone a change in multiple RAT coexistence status, etc.). Alternatively, the software/firmware code may not be directly executable by the processor 655-a but may cause a computer (e.g., when compiled and executed) to implement features described herein. The processor 655-a may include an intelligent hardware device, (e.g., a CPU, a microcontroller, an ASIC, etc.). In the example of FIG. 6C, the communications manager 615-b may be implemented as software/firmware code executable by the processor 655-a.

The components of the devices 600-a, 600-b and/or 600-c may be, individually or collectively, implemented with an ASIC adapted to implement some or all of the applicable features in hardware. In other examples, the features of devices 600-a, 600-b and/or 600-c may be implemented by a processing unit (or core), on an one IC. In other examples, other types of integrated circuits are used (e.g., Structured/Platform ASICs, FPGAs, and other Semi-Custom ICs), which may be programmed in any manner known in the art. The features of each unit may also be implemented, in whole or in part, with instructions embodied in a memory, formatted to be executed by a general or application-specific processor.

Figure 7:
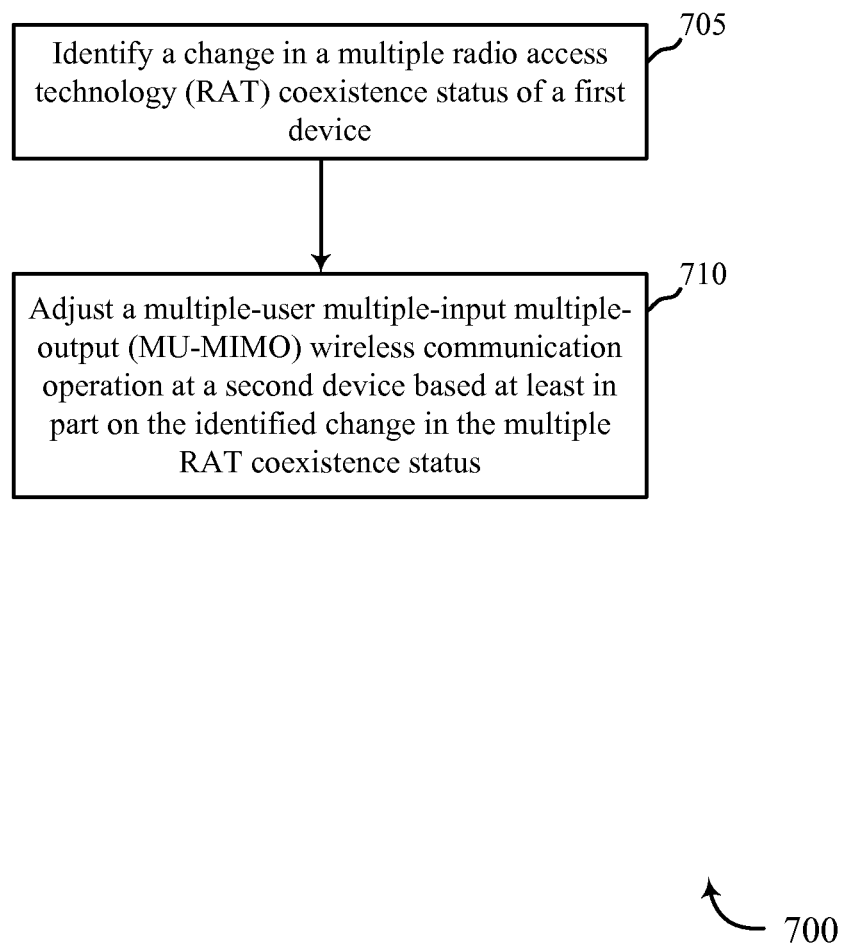
FIG. 7 is a flowchart that depicts an example of a method of wireless communication in accordance with various examples.

FIG. 7 shows a flowchart illustrating a method 700 of wireless communication in accordance with various examples. The method 700 may be implemented using, for example, the systems, communication flow(s) and devices of FIGS. 1, 2, 3, 4, 5A, 5B, 5C, 6A, 6B and 6C. Blocks 705 and 710 (alone or together) may be performed by the communications manager 515 of FIG. 5A, and/or a subcomponent thereof, such as the coexistence change detector 520 of FIG. 5A, for example.

At block 705, a wireless communication device, such as an AP, may identify a change in a multiple RAT coexistence status of a first device, such as a STA. As stated above, identifying the change may be implicit and may involve receiving a signal or communication from the first device, or in some cases may involve a lack of receiving a communication or signal (e.g., an acknowledgement) from the first device. In some cases, identifying the change may involve detecting a status of an operational mode of the first device, such as enablement or disablement of a MAC aggregation mode at the first device. The change in the multiple RAT coexistence status of the first device may be an activation or a deactivation of a coexistence mode at the first device that is disruptive to MU-MIMO communications, such as a coexistence mode in which the first device is actively communicating using an RAT other than the RAT used for MU-MIMO communications (e.g., a BT or LTE radio using separate antenna(s)).

At block 710, based at least in part on the identified coexistence change, the wireless communication device may adjust an MU-MIMO wireless communication operation at a second device, such as the AP. Adjusting the MU-MIMO wireless communication operation at the second device may involve excluding or including the first device for MU-MIMO communications with the second device.

Figure 8:
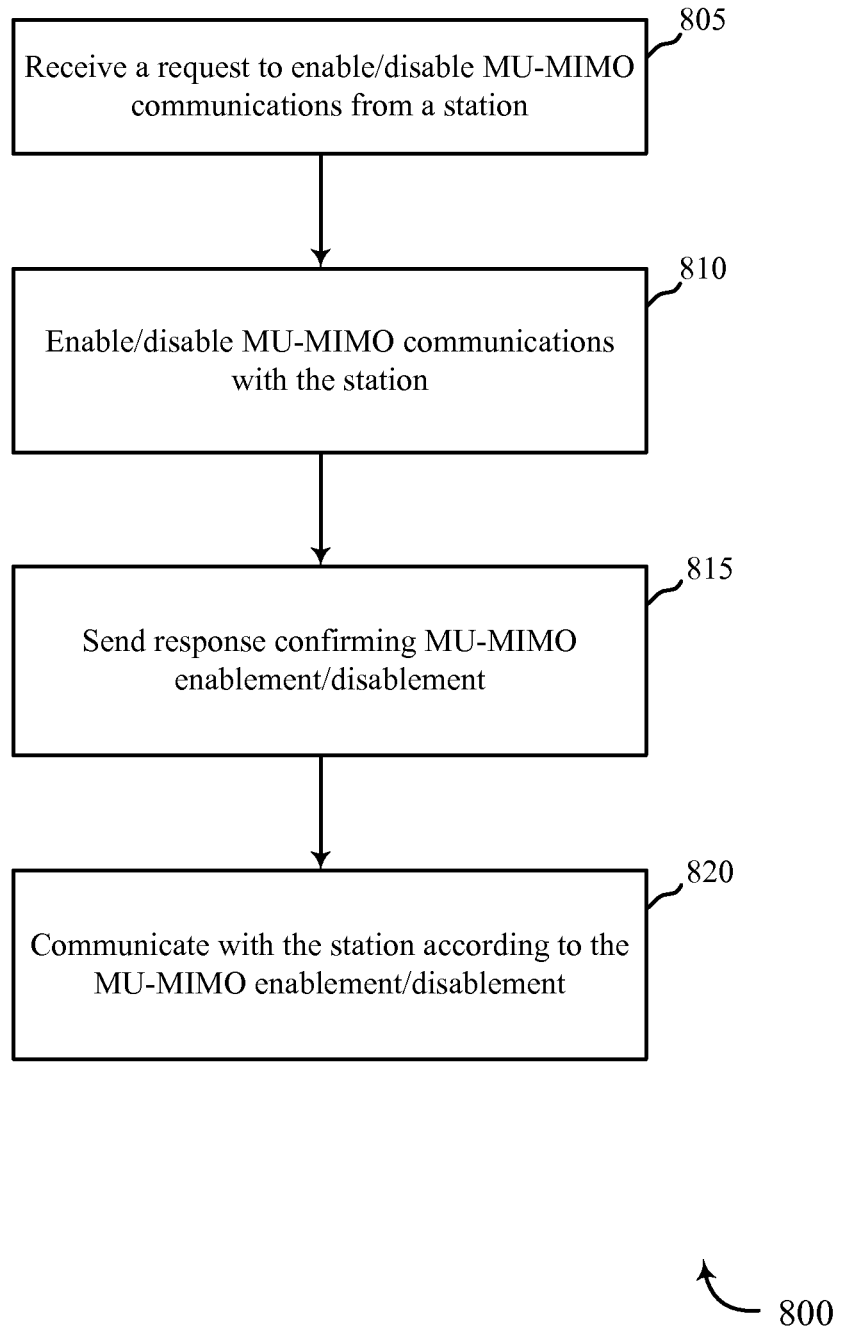
FIG. 8 is a flowchart that depicts another example of a method of wireless communication in accordance with various examples.

FIG. 8 shows a flowchart illustrating a method 800 of wireless communication in accordance with various examples. The method 800 may be implemented using, for example, the systems, communication flow(s) and devices of FIGS. 1, 2, 3, 4, 5A, 5B, and 5C. Block 805 may be performed by the communications manager 515 of FIG. 5A (via the receiver 512), and/or a subcomponent thereof, such as the coexistence change detector 520 of FIG. 5A, for example. Block 810 also may be performed by the communications manager 515 of FIG. 5A, and/or a subcomponent thereof, such as the MU-MIMO coordinator 525 of FIG. 5A, for example. Block 820 may be performed by the communications manager 515 of FIG. 5A, and/or a subcomponent thereof, such as the MU-MIMO coordinator 525 of FIG. 5A, in combination with the receiver 512 and/or the transmitter 514.

At block 805, a wireless communication device, such as an AP, may receive a request to enable or disable MU-MIMO communications from another device, such as a STA. In response to the request, the wireless communication device may enable or disable MU-MIMO communications with the other device, at block 810. At block 815, the wireless communication device may send a response to the other device to confirm or otherwise acknowledge MU-MIMO enablement/disablement. Then, at block 820, the wireless communication device may communicate with the other device according to the MU-MIMO enablement or disablement, thereby either including the other device in MU-MIMO communications or communicating individually with the other device (e.g., excluding the other device from MU-MIMO communications used to communicate with devices, such as STAs, other than the other device).

The request to enable or disable MU-MIMO communications from another device may be an explicit signal or communication, such as an action frame (e.g., a DELBA or ADDBA action frame), and also may be vendor specific (e.g., a DELMU or ADDMU action frame). Alternatively, the request may be implicit and may comprise a PS-POLL with the PM bit set equal to zero or one.

Figure 9:
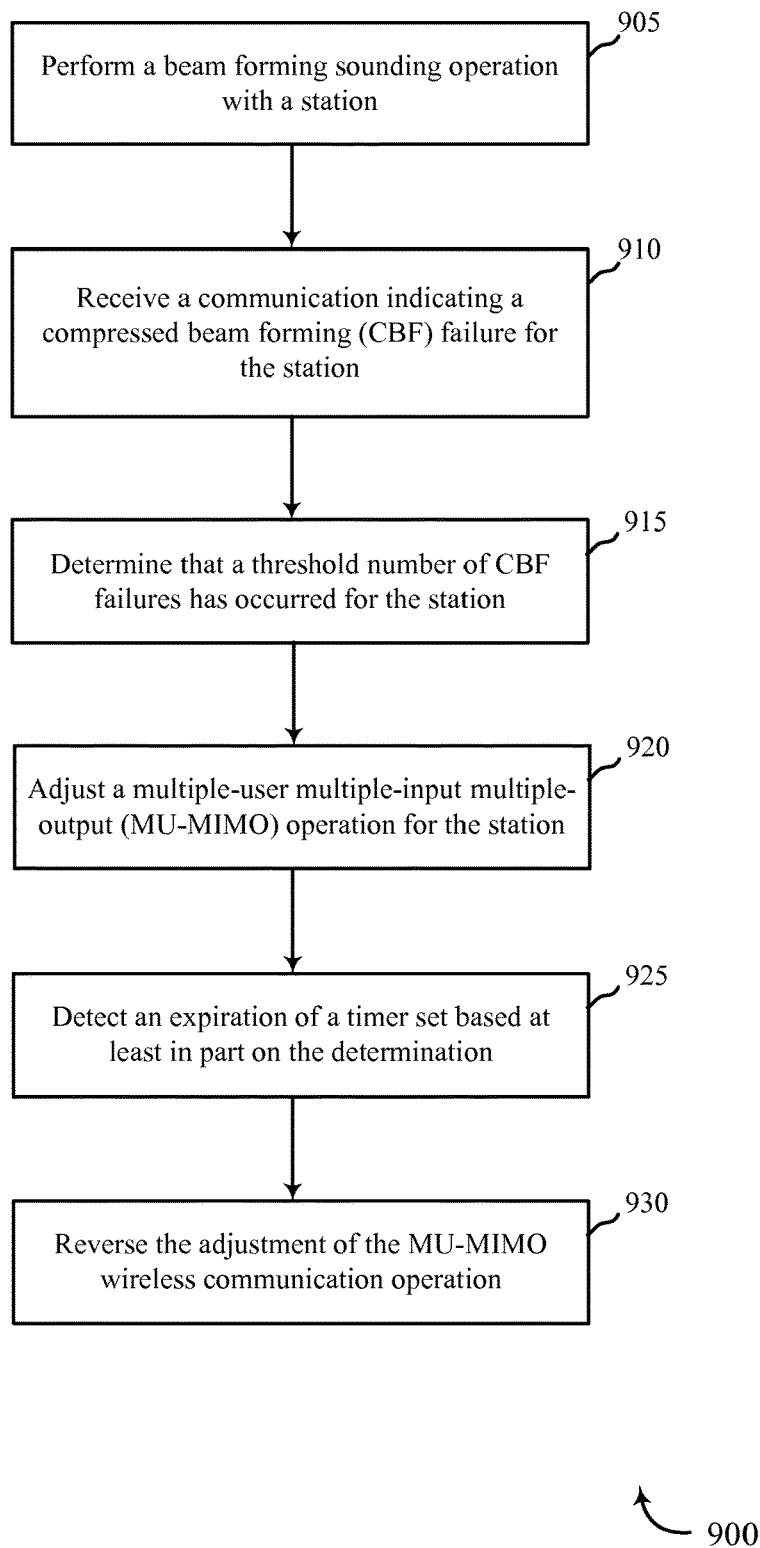
FIG. 9 is a flowchart that depicts still another example of a method of wireless communication in accordance with various examples.

FIG. 9 shows a flowchart illustrating a method 900 of wireless communication in accordance with various examples. The method 900 may be implemented using, for example, the systems, communication flow(s) and devices of FIGS. 1, 2, 3, 4, 5A, 5B, and 5C. Block 905 may be performed by the communications manager 515 of FIG. 5A (via the transmitter 514), and/or a subcomponent thereof, such as the MU-MIMO coordinator 525 of FIG. 5A, for example. Block 910 and block 915 also may be performed by the communications manager 515 of FIG. 5A, and/or a subcomponent thereof, such as the coexistence change detector 520 of FIG. 5A, for example. Block 925 may be performed by the communications manager 515 of FIG. 5A, and/or a subcomponent thereof, such as the timer 527, for example. Block 920 and block 930 may be performed by the communications manager 515 of FIG. 5A, and/or a subcomponent thereof, such as the MU-MIMO coordinator 525 of FIG. 5A, in combination with the receiver 512 and/or the transmitter 514.

At block 905, a wireless communication device, such as an AP, may perform a beam forming sounding operation with another device, such as a STA. In response to the sounding operation, the wireless communication device may receive a communication indicating a CBF failure for the other device at block 910. Alternatively at block 910, a CBF failure may be indicated by a lack of a response, such as a lack of an acknowledgement in response to a communication from the wireless communication device for the sounding operation.

At block 915, the wireless communication device may determine that a threshold number of CBF failures has occurred for the other device. For example, the wireless communication device may sum CBF failures and compare the sum to the threshold number. At block 920, based at least in part on the determination at block 915, the wireless communication device may adjust an MU-MIMO operation at the wireless communication device for the other device, e.g., enabling MU-MIMO communications with the other device. At block 925, the wireless communication device may detect an expiration of a timer that is set based at least in part on the determination at block 915. Then, based at least in part on the detection at block 925, the wireless communication device may reverse the adjustment of the MU-MIMO wireless communication operation at the wireless communication device.

Although not shown for the sake of brevity, it should be understood that the wireless communication device may perform MU-MIMO communications with the other device after the adjustment at block 920, and until the adjustment is reversed at block 930. After the adjustment is reversed at block 930, the wireless communication device may exclude the other device from MU-MIMO communications performed with devices, such as STAs other than the other device.

As described above, performing the beam forming sounding operation may involve sending communications from the wireless communication device to the other device. The wireless communication device may receive communications in response to the sounding communications that indicate CBF failures, or may not receive any response to the sounding communications. Adjusting the MU-MIMO wireless communication operation at the second device may involve excluding the first device for MU-MIMO communications with the second device, and reversing the adjustment may involve including the first device for MU-MIMO communications with the second device.

Figure 10:
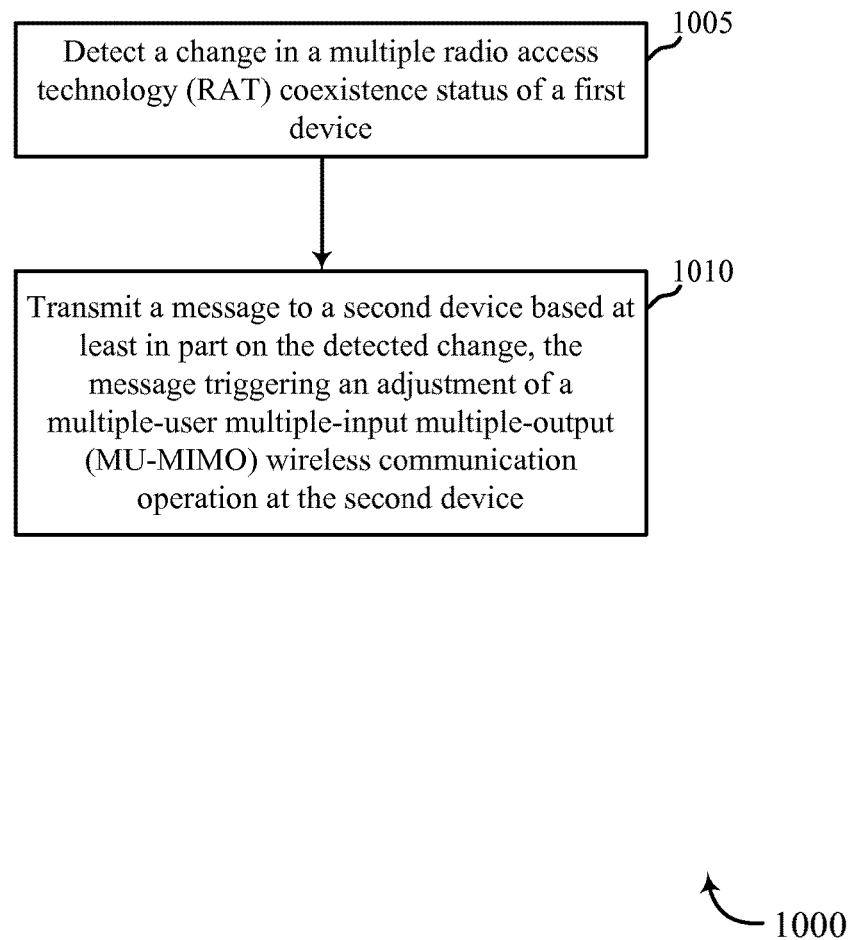
FIG. 10 is a flowchart that depicts a further example of a method of wireless communication in accordance with various examples.

FIG. 10 shows a flowchart illustrating a method 1000 of wireless communication in accordance with various examples. The method 1000 may be implemented using, for example, the systems, communication flow(s) and devices of FIGS. 1, 2, 3, 4, 6A, 6B, and 6C. Block 1005 may be performed by the communications manager 615 of FIG. 6A, and/or a subcomponent thereof, such as the coexistence status detector 620 of FIG. 6A, for example. Block 1010 also may be performed by the communications manager 615 of FIG. 6A, and/or a subcomponent thereof, such as the message generator 625, in combination with the first radio 612 of FIG. 6A, for example.

At block 1005, a first device, such as a STA, may detect a change in a multiple RAT coexistence status of the first device. Then, at block 1010, based at least in part on the detected change, the first device may transmit a message to a second device, such as an AP. The transmitted message, when received by the second device, may trigger an adjustment of an MU-MIMO wireless communication operation at the second device. The change in the multiple RAT coexistence status of the first device may be an activation or a deactivation of a coexistence mode at the first device that is disruptive to MU-MIMO communications, such as a coexistence mode in which the first device is actively communicating using an RAT other than the RAT used for MU-MIMO communications. The message transmitted to the second device may be a request to enable or disable MU-MIMO communications from another device may be an explicit signal or communication, such as an action frame (e.g., a DELBA or ADDBA action frame), and also may be vendor specific (e.g., a DELMU or ADDMU action frame).

Alternatively, message may be implicit and may comprise a PS-POLL with the PM bit set equal to zero or one.

It will be apparent to those skilled in the art that the methods 700, 800, 900, and 1000 are but example implementations of the tools and techniques described herein. The methods 700, 800, 900, and 1000 may be rearranged or otherwise modified, with blocks added or removed, such that other implementations are possible.

The detailed description set forth above in connection with the appended drawings describes exemplary examples and does not represent the only examples that may be implemented or that are within the scope of the claims. For example, while the foregoing examples are primarily described with reference to WLAN and BT, various other RATs (e.g., WWAN, NFC, eNB, etc.) may be involved. Thus, while the foregoing examples refer to APs and STAs, it should be understood that other devices may be involved corresponding to the particular RATs.

The term "exemplary" or "example," when used throughout this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein (such as the receiver 512, the transmitter 514, the communications managers 515, 515-a, 615, 615-a, the coexistence change detector 520, the MU-MIMO coordinator 525, the timer 527, the processors 530, 530-a, 655, 655-a, the transceivers 540, 540-a, 635, 645, 635-a, 645-a, the coexistence status detector 620, the message generator 625, the coexistence communications coordinator 630, the first radio 612, 612-a, 612-b, and the second radio 614, 614-a, 614-b) may be implemented or performed with a general-purpose processor, a digital signal processor (DSP), an ASIC, an FPGA or other programmable logic device, discrete gate or transistor logic, discrete hardware components, or any combination thereof designed to implement the features described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The features described herein may be implemented in hardware, software executed by a processor, firmware, or any combination thereof. If implemented in software executed by a processor, the features may be stored on or transmitted over as one or more instructions or code on a computer-readable medium. Other examples and implementations are within the scope of the disclosure and appended claims. For example, due to the nature of software, features described above can be implemented using software executed by a processor, hardware, firmware, hardwiring, or combinations of any of these. Features implementing functions may also be physically located at various positions, including being distributed such that portions of features are implemented at different physical locations. Also, as used herein, including in the claims, "or" as used in a list of items (for example, a list of items prefaced by a phrase such as "at least one of" or "one or more of") indicates a disjunctive list such that, for example, a list of [at least one of A, B, or C] means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication at a wireless device, comprising:
    identifying a change in a multiple radio access technology (RAT) coexistence status of a first device based at least in part on an indication to the wireless device;
    suspending multiple-user multiple-input multiple-output (MU-MIMO) communication with the first device based at least in part on the identified change in the multiple RAT coexistence status; and
    communicating with the first device using single-user (SU) MIMO based at least in part on suspending MU-MIMO communication with the first device.

2. The method of claim 1, wherein suspending MU-MIMO communication with the first device comprises:
    disabling MU-MIMO communication between the first device and the wireless device.

3. The method of claim 1, wherein identifying the change in the multiple RAT coexistence status of the first device based at least in part on the indication comprises:
receiving a request from the first device to disable MU-MIMO communications.

4. The method of claim 3, wherein the request comprises a vendor-specific action frame.

5. The method of claim 1, wherein identifying the change in the multiple RAT coexistence status of the first device based at least in part on the indication comprises:
receiving a power save poll (PS-POLL) from the first device.

6. The method of claim 1, wherein identifying the change in the multiple RAT coexistence status of the first device based at least in part on the indication comprises:
detecting a disablement of a media access control (MAC) aggregation mode at the first device.

7. The method of claim 1, further comprising:
performing a beam forming sounding operation, wherein the change in the multiple RAT coexistence status is identified based at least in part on the beam forming sounding operation.

8. The method of claim 7, wherein identifying the change in the multiple RAT coexistence status of the first device based at least in part on the indication comprises:
detecting a number of compressed beam forming (CBF) failures from the beam forming sounding operation is above a predetermined threshold.

9. The method of claim 1, further comprising:
detecting an expiration of a timer, wherein the timer is set based at least in part on the change in the multiple RAT coexistence status; and
resuming MU-MIMO communication with the first device based at least in part on the detected expiration of the timer.

10. The method of claim 9, wherein a duration of the timer is based at least in part on a number of compressed beam forming (CBF) failures occurring since an expiration of a previous timer.

11. The method of claim 1, wherein the identified change in the multiple RAT coexistence status of the first device comprises:
an activation of a coexistence mode at the first device that is disruptive to MU-MIMO communications.

12. A device for wireless communications with another device, comprising:
a detector to identify a change in a multiple radio access technology (RAT) coexistence status of the other device based at least in part on an indication to the device;
a coordinator to suspend multiple-user multiple-input multiple-output (MU-MIMO) communication with the other device based at least in part on the identified change in the multiple RAT coexistence status; and
a transceiver to communicate with the other device using single-user (SU) MIMO based at least in part on the suspended MU-MIMO communication.

13. The device of claim 12, wherein the coordinator to suspend the MU-MIMO communication is configured to cause the device to:
disable MU-MIMO communication with the other device.

14. The device of claim 12, wherein the detector to identify the change in the multiple RAT coexistence status of the other device based at least in part on the indication is configured to:
determine the change in the multiple RAT coexistence status from a power save poll (PS-POLL) received from the other device.

15. The device of claim 12, wherein the detector to identify the change in the multiple RAT coexistence status of the other device based at least in part on the indication is configured to:
detect a disablement of a media access control (MAC) aggregation mode at the other device.

16. The device of claim 12, wherein:
the coordinator is further configured to perform a beam forming sounding operation; and
the detector is further configured to identify the change in the multiple RAT coexistence status based at least in part on the beam forming sounding operation.

17. The device of claim 16, wherein the detector is further configured to detect if a number of compressed beam forming (CBF) failures reaches a predetermined threshold.

18. The device of claim 12, further comprising:
a timer, wherein the timer is set in response to the change in the multiple RAT coexistence status; and
wherein the coordinator is further configured to resume MU-MIMO wireless communication operation with the other device based at least in part on an expiration of the timer.

19. The device of claim 18, wherein a duration of the timer is based at least in part on a number of compressed beam forming (CBF) failures occurring since an expiration of a previous timer.

20. The device of claim 12, wherein the identified change in the multiple RAT coexistence status of the other device comprises:
an activation of a coexistence mode at the other device that is disruptive to MU-MIMO communications.

21. The device of claim 12, wherein the identified change in the multiple RAT coexistence status from the other device comprises a change in at least one from the group consisting of change in:
a profile of a non-wireless local area network (WLAN) radio of the other device,
a protocol of the non-WLAN radio of the other device, and
a level of activity of the non-WLAN radio of the other device.

22. The device of claim 21, wherein the non-WLAN radio is a Bluetooth radio.

23. The device of claim 21, wherein the transceiver comprises one from the group consisting of:
a WLAN transceiver configured to communicate with the other device, and
a wireless wide area network (WWAN) transceiver configured to communicate with the other device.

24. A non-transitory computer-readable medium containing program instructions that, when executed by a processor of an access point, cause the access point to perform operations comprising:
identifying a change in a multiple radio access technology (RAT) coexistence status of a station connected to the access point based at least in part on an indication to the access point;
suspending multiple-user multiple-input multiple-output (MU-MIMO) communication with the station based at least in part on the identified change in the multiple RAT coexistence status; and
communicating with the station using single-user (SU) MIMO based at least in part on suspending MU-MIMO communication with the station.

25. A device for wireless communications with another device, comprising:
   means for identifying a change in a multiple radio access technology (RAT) coexistence status of the other device based at least in part on an indication to the device;
   means for suspending multiple-user multiple-input multiple-output (MU-MIMO) communication with the other device based at least in part on the identified change in the multiple RAT coexistence status; and
   means for communicating with the other device using single-user (SU) MIMO based at least in part on suspending MU-MIMO communication with the other device.

26. The device of claim 25, wherein:
   the means for suspending the MU-MIMO communication is further configured to perform a beam forming sounding operation, and
   the means for identifying the change in the multiple RAT coexistence status is further configured to identify the change in the multiple RAT coexistence status based at least in part on the beam forming sounding operation.

27. The device of claim 26, wherein the means for identifying further comprises means for detecting if a number of compressed beam forming (CBF) failures reaches a predetermined threshold.

28. The method of claim 1, further comprising:
   identifying a second change in the multiple RAT coexistence status of the first device based at least in part on a second indication to the wireless device;
   re-enabling MU-MIMO communication with the first device based at least in part on the identified second change in the multiple RAT coexistence status of the first device; and
   communicating with the first device using MU-MIMO based at least in part on re-enabling MU-MIMO communication.

29. The method of claim 28, wherein identifying the second change in the multiple RAT coexistence status of the first device based at least in part on the second indication comprises:
   receiving a request to enable MU-MIMO communications from the first device.

30. The method of claim 28, wherein identifying the second change in the multiple RAT coexistence status of the first device based at least in part on the second indication comprises:
   detecting an enablement of a media access control (MAC) aggregation mode at the first device;
   detecting a deactivation of a coexistence mode at the first device that is disruptive to MU-MIMO communications; or
   both.

* * * * *